(12) United States Patent
Takahashi et al.

(10) Patent No.: US 8,488,217 B2
(45) Date of Patent: Jul. 16, 2013

(54) IMAGE READING DEVICE AND IMAGE FORMING DEVICE

(75) Inventors: Kaoru Takahashi, Ebina (JP); Shusaku Yokota, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 578 days.

(21) Appl. No.: 12/729,015

(22) Filed: Mar. 22, 2010

(65) Prior Publication Data

US 2011/0013236 A1   Jan. 20, 2011

(30) Foreign Application Priority Data

Jul. 17, 2009   (JP) .................................. 2009-169523

(51) Int. Cl.
*H04N 1/04* (2006.01)
(52) U.S. Cl.
USPC ............ 358/475; 358/474; 358/509; 382/275
(58) Field of Classification Search
USPC ................. 358/475, 474, 509, 513, 514, 501, 358/505; 382/275, 254, 167
See application file for complete search history.

(56) References Cited

U.S. PATENT DOCUMENTS

| | | | |
|---|---|---|---|
| 5,969,343 A | 10/1999 | Nakamura et al. | |
| 5,986,752 A * | 11/1999 | Morito et al. | 356/241.5 |
| 6,072,171 A | 6/2000 | Nakamura et al. | |
| 6,127,675 A | 10/2000 | Nakamura et al. | |
| 6,565,248 B2 * | 5/2003 | Honguh et al. | 362/560 |
| 6,767,122 B2 * | 7/2004 | Maemura et al. | 362/555 |
| 7,656,398 B2 * | 2/2010 | Sakai et al. | 345/204 |
| 7,717,598 B2 * | 5/2010 | Kakizaki et al. | 362/551 |
| 7,920,304 B2 * | 4/2011 | Tatsuno et al. | 358/475 |
| 8,077,369 B2 * | 12/2011 | Sakai et al. | 359/205.1 |
| 8,218,205 B2 * | 7/2012 | Nagatani et al. | 358/475 |
| 8,228,567 B2 * | 7/2012 | Kim | 358/475 |
| 8,279,164 B2 * | 10/2012 | Daiku | 345/102 |
| 8,358,450 B2 * | 1/2013 | Kim | 358/474 |
| 2006/0023218 A1 * | 2/2006 | Jung et al. | 356/419 |
| 2009/0244654 A1 | 10/2009 | Tagawa et al. | |

FOREIGN PATENT DOCUMENTS

| | | |
|---|---|---|
| JP | 09-130545 A | 5/1997 |
| JP | 10-322521 A | 12/1998 |
| JP | 2006-067551 A | 3/2006 |
| JP | 2008-271158 A | 11/2008 |
| JP | 2009-246462 A | 10/2009 |

OTHER PUBLICATIONS

Japanese Office Action for corresponding JP Patent Application 2009-169523 dated Mar. 5, 2013.

* cited by examiner

*Primary Examiner* — Negussie Worku
(74) *Attorney, Agent, or Firm* — Sughrue Mion, PLLC

(57) ABSTRACT

An image reading device including: plural point light sources, each point light source being disposed at a placement interval F in a first direction; a light guiding body having an exit surface, incident light from the plural light sources exiting from the exit surface to a surface to be read, and a width S of the exit surface, in a second direction intersecting with the first direction, being smaller than the placement interval F; a light diffusing portion which diffuses light exiting from the exit surface, at an angle that is greater in the first direction than in the second direction; and a reading portion which receives light reflected at the surface to be read, and reads an image at the surface to be read, is provided.

12 Claims, 16 Drawing Sheets

FIRST DIRECTION POSITION
ON DIFFUSING PLATE

SECOND DIRECTION POSITION
ON DIFFUSING PLATE

IMAGE READING DEVICE AND IMAGE FORMING DEVICE

CROSS-REFERENCE TO RELATED APPLICATION

This application is based on and claims priority under 35 USC 119 from Japanese Patent Application No. 2009-169523 filed on Jul. 17, 2009.

BACKGROUND

1. Technical Field

The present invention relates to an image reading device and an image forming device.

2. Related Art

There are conventionally image reading devices that illuminate light, that exits from a light source, onto a reading document, and image the light, that is reflected by the reading document, onto a photoelectric converting element by an imaging lens, and read the image.

SUMMARY

According to an aspect of the invention, there is provided an image reading device including: plural point light sources, each point light source being disposed at a placement interval F in a first direction; a light guiding body having an exit surface, incident light from the plural light sources exiting from the exit surface to a surface to be read, and a width S of the exit surface, in a second direction intersecting with the first direction, being smaller than the placement interval F; a light diffusing portion which diffuses light exiting from the exit surface, at an angle that is greater in the first direction than in the second direction; and a reading portion which receives light reflected at the surface to be read, and reads an image at the surface to be read.

BRIEF DESCRIPTION OF THE DRAWINGS

Exemplary embodiments of the present invention will be described in detail based on the following figures, wherein.

DETAILED DESCRIPTION

Examples of an image reading device and an image forming device relating to a first exemplary embodiment of the present invention are described.

(Overall Structure)

Figure 1:
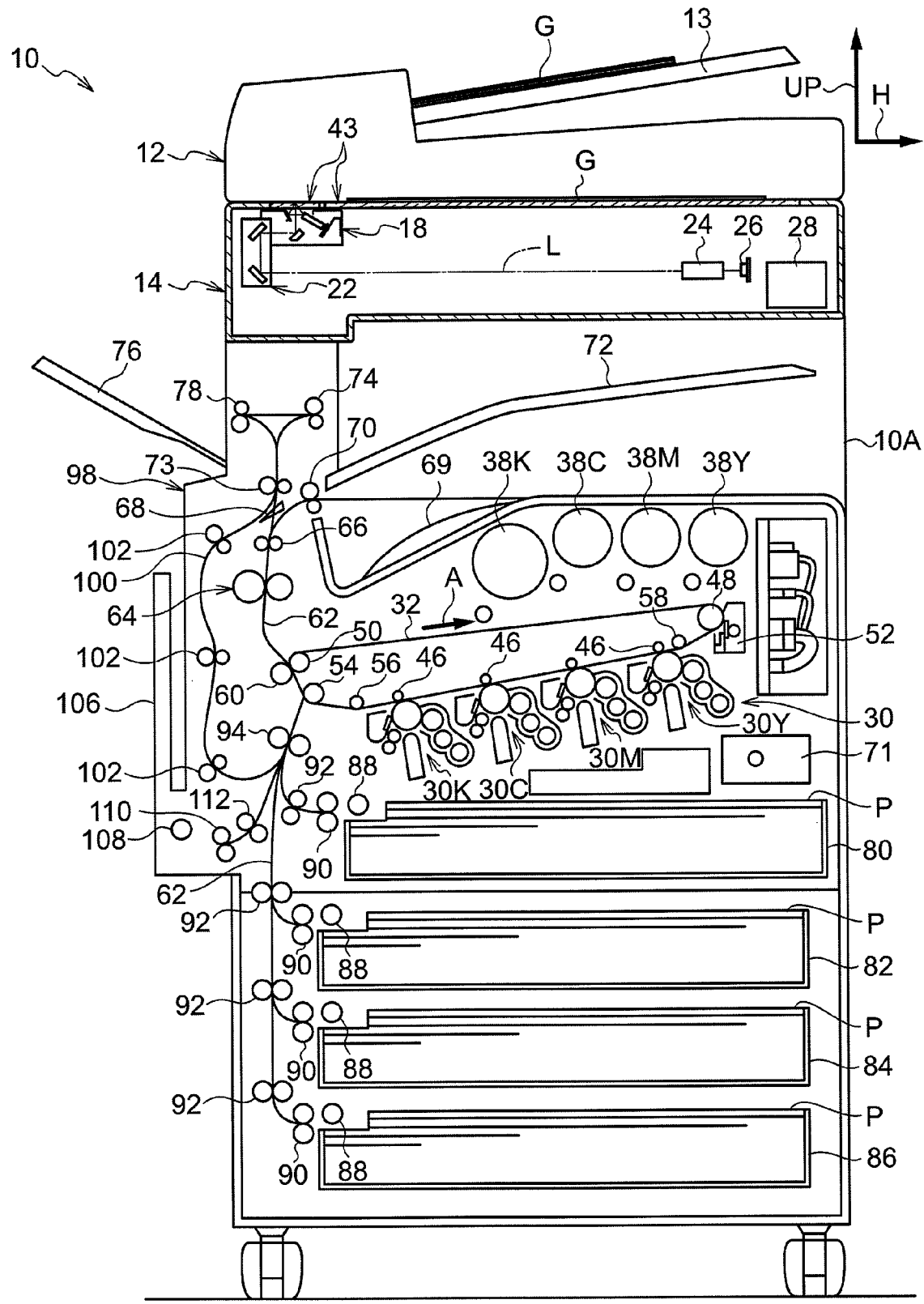
FIG. 1 is an overall view of an image forming device relating to a first exemplary embodiment of the present invention.

As shown in FIG. 1, an automatic document conveying device 12 that automatically conveys plural reading documents G one-by-one, a platen glass 43 on which one of the reading documents G is placed, and a document reading device 14 that is an example of an image reading device that reads a surface GA to be read (see FIGS. 6, 7) of the reading document G that is conveyed by the automatic document conveying device 12 or is placed on the platen glass 43, are provided at an upper portion of a device main body 10A of an image forming device 10 relating to the present exemplary embodiment. Further, a control portion 71, which controls operations of respective portions of the image forming device 10, is provided at a central portion of the device main body 10A. Note that arrow UP in the drawing indicates upward in a vertical direction, and arrow H indicates a horizontal direction.

Plural image forming units 30, that form toner images of respectively different colors, are provided at a central portion in the vertical direction of the device main body 10A. An endless intermediate transfer belt 32, onto which are transferred the toner images that are formed at the image forming units 30 of the respective colors while the intermediate transfer belt 32 is driven to circulate in the direction of arrow A in the drawing, is provided at an upper side of the image forming units 30. Note that the image forming unit 30 corresponds to an example of the image forming portion.

Four image forming units 30Y, 30M, 30C, 30K are provided as the image forming units 30 in correspondence with the respective colors of toners of yellow (Y), magenta (M), cyan (C), black (K). The image forming units 30Y, 30M, 30C, 30K are lined-up in an inclined state with respect to the horizontal direction (arrow H direction) such that the position of the image forming unit 30Y, at which is formed an yellow (Y) toner image that is transferred onto the intermediate transfer belt 32 first, is high, and the position of the image forming unit 30K, at which is formed a black (K) toner image that is transferred onto the intermediate transfer belt 32 last, is low.

These four image forming units 30Y, 30M, 30C, 30K are basically structured by the same members. Note that, in the following description, when distinguishing between the respective colors, the letters (Y, M, C, K) corresponding to the respective colors are appended to the reference numeral, whereas, when the respective colors are not particularly differentiated, the letters corresponding to the respective colors are omitted.

Figure 2:
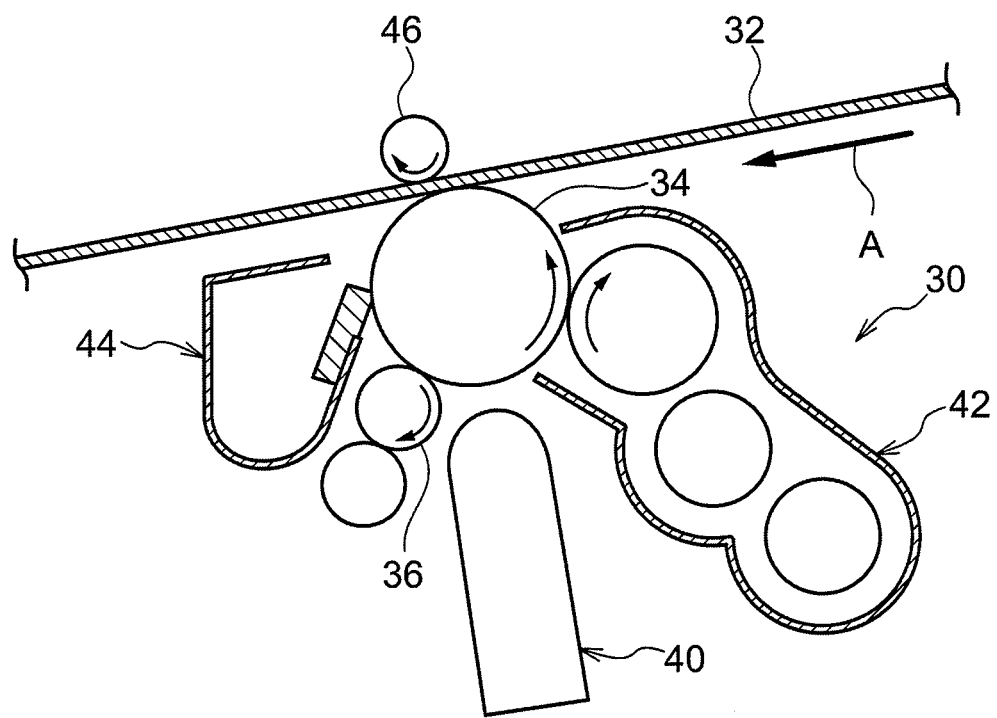
FIG. 2 is a structural drawing of an image forming unit relating to the first exemplary embodiment of the present invention.

As shown in FIG. 2, at the image forming unit 30 of each color, an image holding body 34, which rotates due to an unillustrated driving portion, is provided, and further, a charging member 36 for primary charging that charges a surface of the image holding body 34 is provided.

An exposure device 40, that exposes light of the corresponding color onto the surface of the image holding body 34 whose surface has been charged by the charging member 36 and that forms an electrostatic latent image thereon, is provided at a downstream side, in a rotating direction of the image holding body 34, of the charging member 36. A developing device 42, that develops, by the toner of the corresponding color, the electrostatic latent image formed on the surface of the image holding body 34 and makes the image visible as a toner image, is provided at the downstream side, in the rotating direction of the image holding body 34, of the exposure device 40.

Note that, as shown in FIG. 1, toner cartridges 38Y, 38M, 38C, 38K, that supply the toners of the respective colors to the developing devices 42 of the respective colors of yellow (Y), magenta (M), cyan (C), black (K), are provided above the intermediate transfer belt 32. The toner cartridge 38K, which accommodates the black (K) color toner, is made to be larger than the toner cartridges 38Y, 38M, 38C of the other colors, in conformance with the frequency of usage thereof.

On the other hand, as shown in FIG. 2, a primary transfer member 46, that is for transferring onto the intermediate transfer belt 32 the toner image formed on the surface of the image holding body 34, is provided at a side of the intermediate transfer belt 32 opposite the image holding body 34. Further, a cleaning device 44, that cleans the residual toner and the like that remain on the surface of the image holding body 34 without having been transferred from the image holding body 34 to the intermediate transfer belt 32, contacts the surface of the image holding body 34, and is provided at the downstream side, in the rotating direction of the image holding body 34, of the primary transfer member 46.

Due to this structure, image data of the respective colors is successively output to the exposure devices 40(Y, M, C, K) that are individually provided at the image forming units 30(Y, M, C, K) of the respective colors of yellow (Y), magenta (M), cyan (C), black (K). Further, the lights, that exit from the exposure devices 40(Y, M, C, K) in accordance with the image data, expose the surfaces of the corresponding image holding bodies 34 such that electrostatic latent images are formed on the surfaces of the image holding bodies 34. The electrostatic latent images formed on the surfaces of the image holding bodies 34 are developed by the developing devices 42(Y, M, C, K) as toner images of the respective colors of yellow (Y), magenta (M), cyan (C), black (K), respectively.

The toner images of the respective colors of yellow (Y), magenta (M), cyan (C), black (K), that are successively formed on the surfaces of the image holding bodies 34, are transferred, by the primary transfer members 46 and so as to be superposed one on another, onto the intermediate transfer belt 32 that is incliningly disposed at an incline above the image forming units 30(Y, M, C, K) of the respective colors.

Here, as shown in FIG. 1, the intermediate transfer belt 32 is trained, at a predetermined tension, around a driving roller 48 that imparts driving force to the intermediate transfer belt 32, a supporting roller 50 that rotates and that supports the intermediate transfer belt 32 from the obverse thereof, a tension imparting roller 54 that imparts tension to the intermediate transfer belt 32, a first driven roller 56, and a second driven roller 58.

A cleaning device 52, that cleans the surface of the intermediate transfer belt 32, is provided at a side of the intermediate transfer belt 32 opposite the driving roller 48. The cleaning device 52 can be freely installed in and removed from the device main body 10A due to a front cover (not illustrated), that is provided at a front side (a front side at which a user stands) of the device main body 10A, being opened.

A secondary transfer member 60 that is for secondarily-transferring, onto a recording sheet P that serves as a recording medium, the toner image that is primarily-transferred on the intermediate transfer belt 32, is disposed so as to, together with the supporting roller 50, nip the intermediate transfer belt 32 at a lower side end portion of the intermediate transfer belt 32 that is disposed in a state of being inclined at a predetermined angle with respect to the horizontal direction (the arrow H direction). Namely, the position that is nipped by the secondary transfer member 60 and the supporting roller 50 is a secondary transfer position at which the toner image is transferred onto the recording sheet P.

A fixing device 64 that fixes the toner image on the recording sheet P, on which the toner image has been transferred by the secondary transfer member 60 and that is conveyed along a conveying path 62, is provided above the supporting roller 50 and the secondary transfer member 60. The fixing device 64 is structured by a heating roller that is disposed at an image surface side of the recording sheet P, and a pressure-applying roller that applies pressure to the recording sheet P toward the heating roller.

Further, conveying rollers 66, which convey the recording sheet P on which the toner image has been fixed, are provided at the downstream side in the conveying direction of the recording sheet P (hereinafter simply called "conveying direction downstream side") of the fixing device 64. A switching gate 68 that switches the conveying direction of the recording sheet P is provided at the conveying direction downstream side of the conveying rollers 66. First discharging rollers 70, which discharge-out to a first discharging portion 69 the recording sheet P guided by the switching gate 68 that has been switched to one direction, are provided at the conveying direction downstream side of the switching gate 68.

Second discharging rollers 74 that discharge-out to a second discharging portion 72 the recording sheet P that is guided by the switching gate 68 that has been switched to the other direction and that is conveyed by conveying rollers 73, and third discharging rollers 78 that discharge the recording sheet P out to a third discharging portion 76, are provided at the conveying direction downstream side of the switching gate 68.

On the other hand, sheet feeding portions 80, 82, 84, 86 in which the recording sheets P are accommodated are provided at the upstream side in the conveying direction of the recording sheet P (hereinafter simply called "conveying direction upstream side") of the secondary transfer member 60. The recording sheets P of different sizes are accommodated in the respective sheet feeding portions 80, 82, 84, 86.

A sheet feeding roller 88, that takes the accommodated recording sheet P out to the conveying path 62 from the sheet feeding portion 80, 82, 84, 86, is provided at each of the sheet feeding portions 80, 82, 84, 86. Conveying rollers 90 and conveying rollers 92, that convey the recording sheets P one-by-one, are provided at the conveying direction downstream sides of the sheet feeding rollers 88. Position adjusting rollers 94, that once stop the recording sheet P and send the recording sheet P out to the secondary transfer position at a predetermined timing, are provided at the conveying direction downstream side of the conveying rollers 92.

On the other hand, in order to form images on both surfaces of the recording sheet P, a conveying unit 98 for both sides, that inverts and conveys the recording sheet P, is provided at the side of the secondary transfer position. An inversion path 100, that the recording sheet P that is conveyed by reversely rotating the conveying rollers 73 is fed-into, is provided at the conveying unit 98 for both sides. Plural conveying rollers 102 are provided along the inversion path 100. The recording sheet P that is conveyed by these conveying rollers 102 is conveyed toward the position adjusting rollers 94 again in a state in which the obverse and reverse thereof are inverted.

A foldaway manual feeding portion 106 is provided next to the conveying unit 98 for both sides. A sheet feeding roller 108 and conveying rollers 110, 112, that convey the recording sheet P that has been fed-in from the opened foldaway manual feeding portion 106, are provided. The recording sheet P conveyed by the conveying rollers 110, 112 is conveyed to the position adjusting rollers 94.

The structure of the automatic document conveying device 12 is described next.

Figure 3:
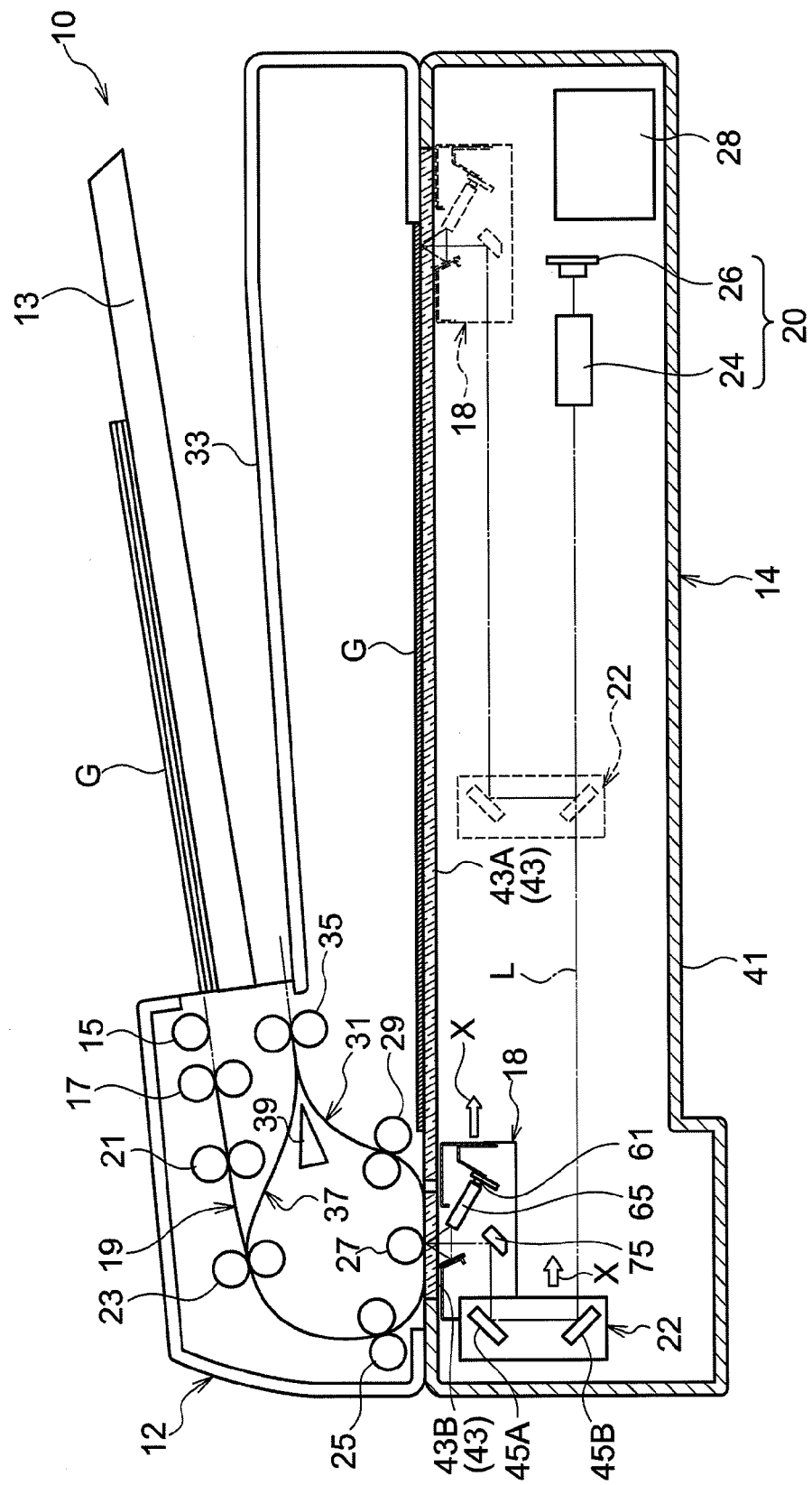
FIG. 3 is a structural drawing of an automatic document conveying device and a document reading device relating to the first exemplary embodiment of the present invention.

As shown in FIG. 3, the automatic document conveying device 12 has a document stand 13 on whose top surface plural reading documents G are placed, a feeding-out roller 15 that feeds the reading documents G out one-by-one from the document stand 13, and first conveying rollers 17 that convey the reading document that is fed-out by the feeding-out roller 15, further toward the downstream side.

The automatic document conveying device 12 has a first conveying path 19 on which the reading document G, that is fed-out from the document stand 13, is initially conveyed. Provided at the first conveying path 19 are second conveying rollers 21 that convey the reading documents that have been singly separated from one another, to the rollers at the downstream side, third conveying rollers 23 that convey the reading document G to the rollers at the further downstream side and form a loop, position adjusting rollers 25 that, after having been stopped once, the rotation thereof is restarted in accordance with the reading timing, and that supply the reading document G while adjusting the position of the leading end of the reading document G with respect to the document reading device 14, an assisting roller 27 that assists in the conveying of the reading document G that is being read, and fourth conveying rollers 29 that convey the reading document G that has been read even further downstream. Note that guide members, that guide the reading document G that is being conveyed, are provided at the first conveying path 19, but illustration thereof is omitted.

A second conveying path 31 is provided at the downstream side of the fourth conveying rollers 29. Discharging rollers 35 that discharge the reading document for which reading is finished, to a discharging portion 33 are provided at the downstream side of the second conveying path 31.

On the other hand, a third conveying path 37 for inverting the reading document G that has passed through the second conveying path 31, is formed from the downstream side of the second conveying path 31 toward the third conveying rollers 23. A switching gate 39, that switches the conveying path of the reading document G between the second conveying path 31 and the third conveying path 37, is provided at a branching position between the second conveying path 31 and the third conveying path 37.

Here, the feeding-out roller 15 is raised or lowered by an unillustrated driving portion that includes a motor. During standby of the image forming device 10, the feeding-out roller 15 is raised and held at a withdrawn position. During the conveying of the reading document the feeding-out roller 15 is lowered and conveys the reading document G that is at the top-most position on the document stand 13. Further, the feeding-out roller 15 and the first conveying rollers 17 rotate due to the coupling of a clutch mechanism (not shown) and convey the reading document G.

The first conveying rollers 17, the second conveying rollers 21 and the third conveying rollers 23 cause the leading end of the reading document G to abut the position adjusting rollers 25 that are stopped, and form a loop. At the position adjusting rollers 25, while the loop is formed, the leading end position of the reading document G, which bites into the position adjusting rollers 25, is adjusted. Due to the loop formation of the reading document G, the reading timing is adjusted, and further, offset (skewing) of the reading document G during reading is suppressed. By starting rotation of the position adjusting rollers 25, that were stopped, in accordance with the timing of the start of reading, reading of the reading document G is started.

When reading of one side of the reading document G is started, the end portion of the switching gate 39 is disposed at the upper side, and the switching gate 39 is switched so as to discharge, to the discharge portion 33, the reading document G that has passed through the fourth conveying rollers 29. On the other hand, when both sides of the reading document G are to be read in succession, the end portion of the switching gate 39 is lowered so as to guide the reading document G to the third conveying path 37 in order to invert the reading document G. Due thereto, the reading document G is led through the third conveying path 37 to the first conveying path 19 again.

The structure of the document reading device 14 is described next.

At the document reading device 14, the platen glass 43 is mounted to the top portion of a case 41 that is provided at the lower portion of the automatic document conveying device 12. The platen glass 43 is structured by a first platen glass 43A on which the reading document G is placed in a stationary state, and a second platen glass 43B that forms a transmitting portion of light for reading the reading document G while the reading document G is being conveyed.

Further, the document reading device 14 has a first carriage 18 and a second carriage 22. Mounted to the first carriage 18 are light-emitting elements 61 that emit light for reading the image of the surface GA to be read (see FIG. 6) of the reading document a light guiding member 65 that guides the light emitted from the light-emitting elements 61 to the surface GA to be read of the reading document G, and a first mirror 75 that reflects the light that exits from the light guiding member 65 and is reflected at the surface GA to be read. Mounted to the second carriage 22 are a second mirror 45A and a third mirror 45B that guide the light, that is incident from the first mirror 75 of the first carriage 18, to an imaging portion 20. Note that the imaging portion 20 corresponds to an example of the reading portion.

While the first carriage 18 is stationary beneath the second platen glass 43B that is at an initial position (i.e., under the conveying surface of the reading document G), or while the first carriage 18 moves along the surface GA to be read (see FIG. 7) of the reading document G over the entire first platen glass 43A, the first carriage 18 illuminates light L onto the reading document G by light-emission of the light-emitting elements 61, and guides the light L, that is reflected at the reading document to the second mirror 45A of the second carriage 22. Note that the detailed structure of the first carriage 18 is described below.

The second carriage 22 has the second mirror 45A that reflects downward the light L that is incident from the first mirror 75 of the first carriage 18, and the third mirror 45B that turns back, in the arrow X direction, the light L that is reflected at the second mirror 45A.

The imaging portion 20 has a lens 24 for imaging that images the light L (the optical image) turned-back by the third mirror 45B, and a photoelectric converting element 26 that photoelectrically converts the optical image that is imaged by the lens 24 for imaging. The electric signals (image signals) converted by the photoelectric converting element 26 are sent to an image processing device 28 that is electrically connected to the photoelectric converting element 26. At the image processing device 28, the electric signals are subjected to image processing, and the image-processed image signals are sent to the exposure devices 40 (see FIG. 2) by the aforementioned control portion 71 (see FIG. 1).

Here, first, when the image of the reading document G placed on the first platen glass 43A is to be read, the first carriage 18 and the second carriage 22 move in the moving direction (the arrow X direction) at a ratio of moving distances of 2:1. At this time, the light L is illuminated from the light-emitting elements 61 of the first carriage 18 onto the surface GA to be read (see FIG. 7) of the reading document G, and the light L reflected at the surface GA to be read is guided to the second carriage 22, is reflected by the second mirror 45A and the third mirror 45B in that order, and is guided to the lens 24 for imaging. Further, the light L, which is guided to the lens 24 for imaging, is imaged on the light-receiving surface of the photoelectric converting element 26. Note that, by making the moving distance of the second carriage 22 be half of the moving distance of the first carriage 18, the optical path length of the light L from the surface GA to be read of the reading document G to the photoelectric converting element 26 does not vary.

The photoelectric converting element 26 is a one-dimensional sensor, and processes one line of the reading document G in a direction intersecting with the moving direction (the arrow X direction). At the document reading device 14, after the reading of one line in the direction intersecting with the moving direction is finished, the first carriage 18 is moved in the moving direction, and the next line of the reading document G is read. By carrying out this process over the entire reading document G, reading of one page is completed. Note that, in the following description, the moving direction of the first carriage 18 and the second carriage 22 is called the subscanning direction, and the direction intersecting with the moving direction is called the main scanning direction.

On the other hand, when reading the image of the reading document G on the second platen glass 43B, the reading document G that is conveyed by the automatic document conveying device 12 passes along the top of the second platen glass 43B. At this time, the first carriage 18 and the second carriage 22 are in a state of being stopped at the reading position of the solid lines shown at one end (the left end in FIG. 3) of the document reading device 14. At this reading position, first, the light L, which is reflected at the first line of the reading document G that is conveyed-in, is imaged at the lens 24 for imaging, and the image is read-in by the photoelectric converting element 26. Namely, after the processing of one line in the main scanning direction by the photoelectric converting element 26 that is a one-dimensional sensor, the next one line in the main scanning direction of the reading document G that is conveyed is read-in. Then, due to the trailing end of the reading document G passing the reading position of the second platen glass 43B, reading of one page of the reading document G over the subscanning direction is completed.

(Structure of Main Portion)

Details of the structure of the optical system provided at the first carriage 18 are described next.

Figure 4:
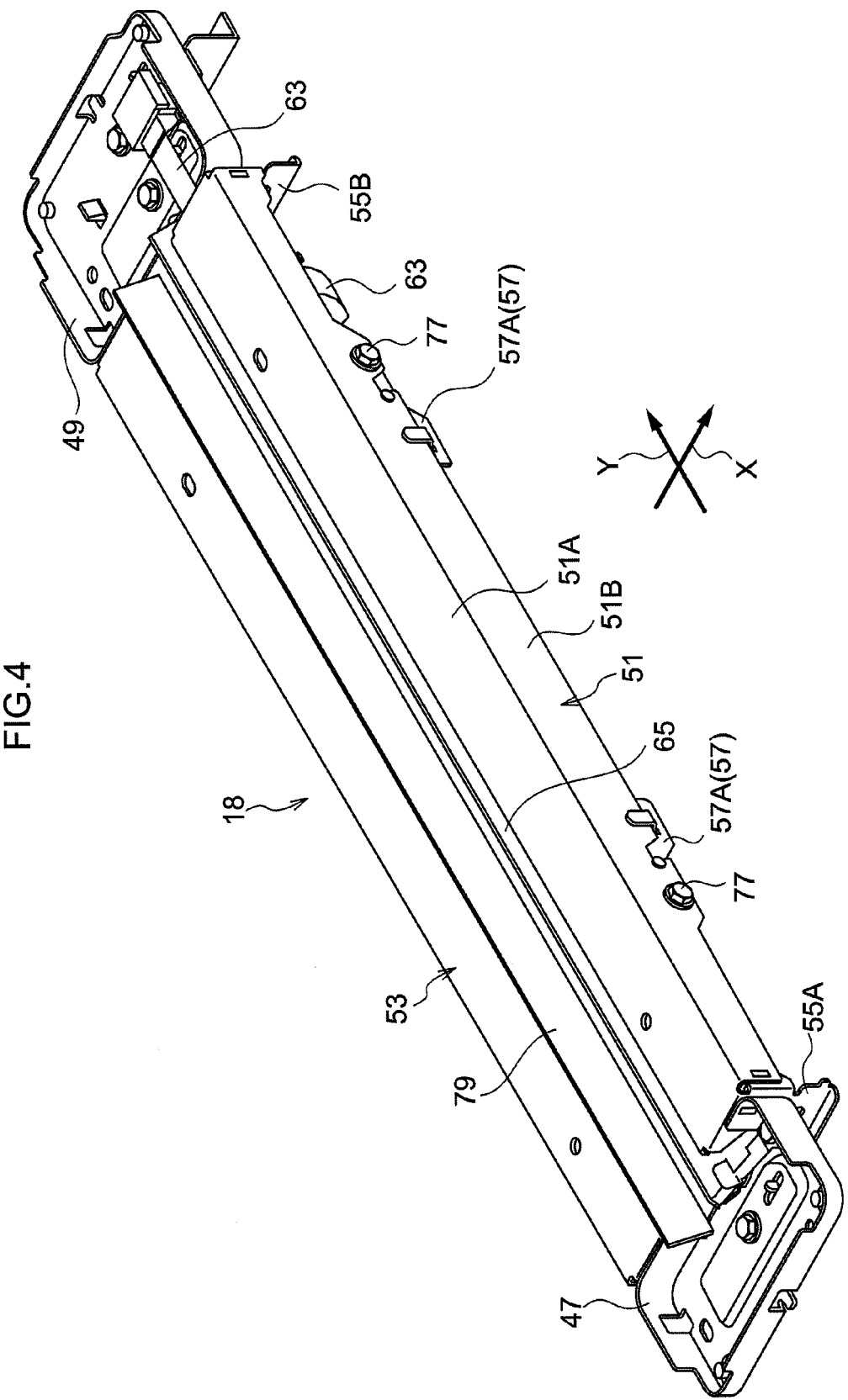
FIG. 4 is a perspective view of a main portion of the document reading device relating to the first exemplary embodiment of the present invention.

As shown in FIG. 4, the first carriage 18 is structured by both end portions of a first holder 51 and a second holder 53, that are sheet metals disposed such that the longitudinal directions thereof are the main scanning direction and with an interval therebetween in the subscanning direction (arrow X direction), being mounted to the top portions of two side plates 55A, 55B that are disposed so as to oppose one another with an interval therebetween in the main scanning direction (arrow Y direction). Further, a third holder 47, a fourth holder 49 are mounted to the side plates 55A, 55B.

Figure 6:
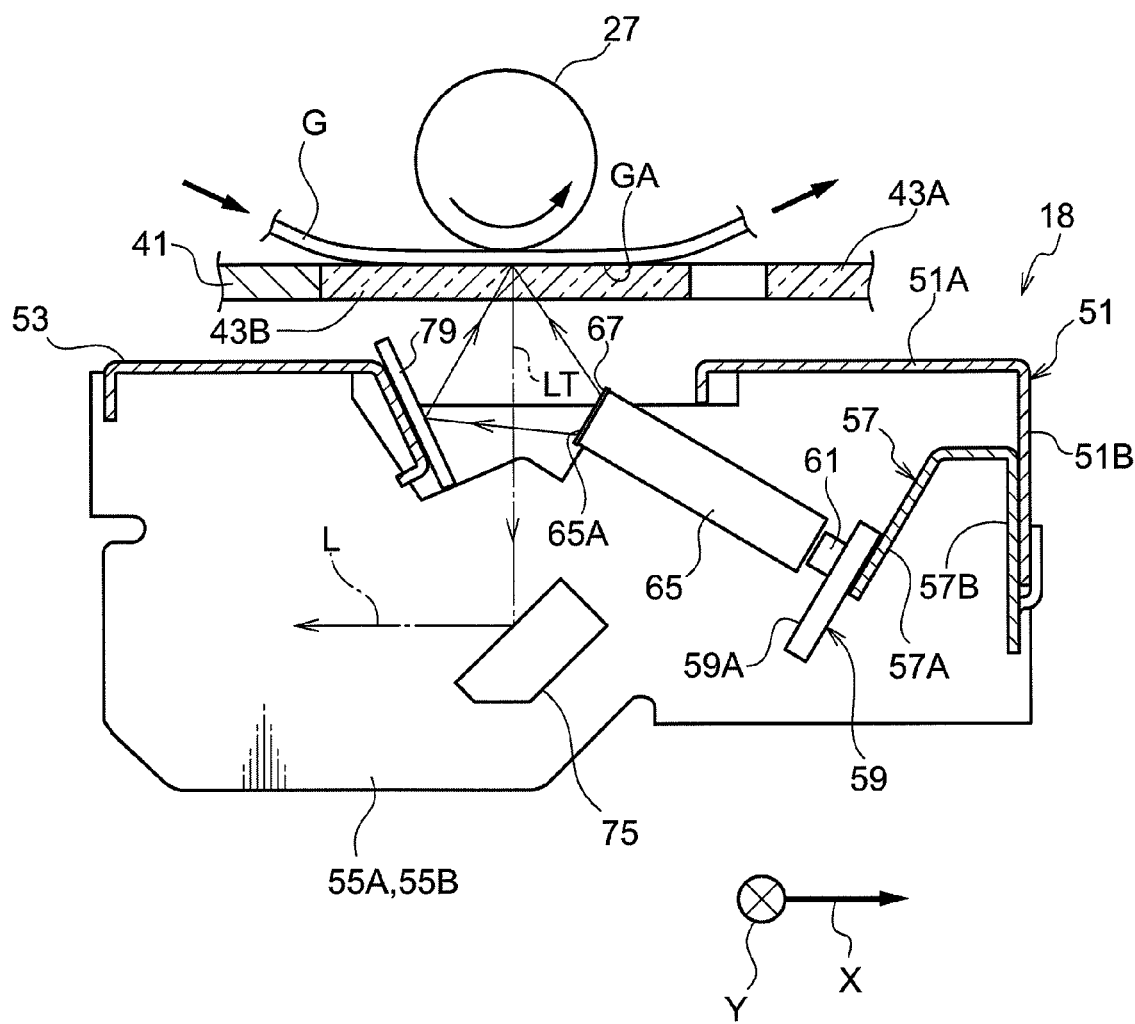
FIG. 6 is a cross-portional view in the subscanning direction of the main portion of the document reading device relating to the first exemplary embodiment of the present invention.

The top surfaces of the first holder 51 and the second holder 53 form the top surface of the first carriage 18, and are disposed so as to face the surface GA to be read (see FIG. 6)

of the reading document G. Note that the placement interval in the main scanning direction between the side plate 55A and the side plate 55B is larger than the width of an image forming region in the main scanning direction of the reading document G (see FIG. 1).

The cross-portion of the first holder 51 in the subscanning direction is L-shaped, and the first holder 51 is structured by a top wall 51A that serves as the top surface of the first carriage 18, and a side wall 51B at the front in the subscanning direction (moving direction) of the first carriage 18. The end portion of the top wall 51A is bent toward the lower side. Further, planar portions 57A that are one planar portion of a bracket 57, whose longitudinal direction is the main scanning direction and whose cross-portion in the subscanning direction is substantially V-shaped, are fixed by screws 77 to the lower portion of the side wall 51B at the inner side of the first holder 51.

Figure 5:
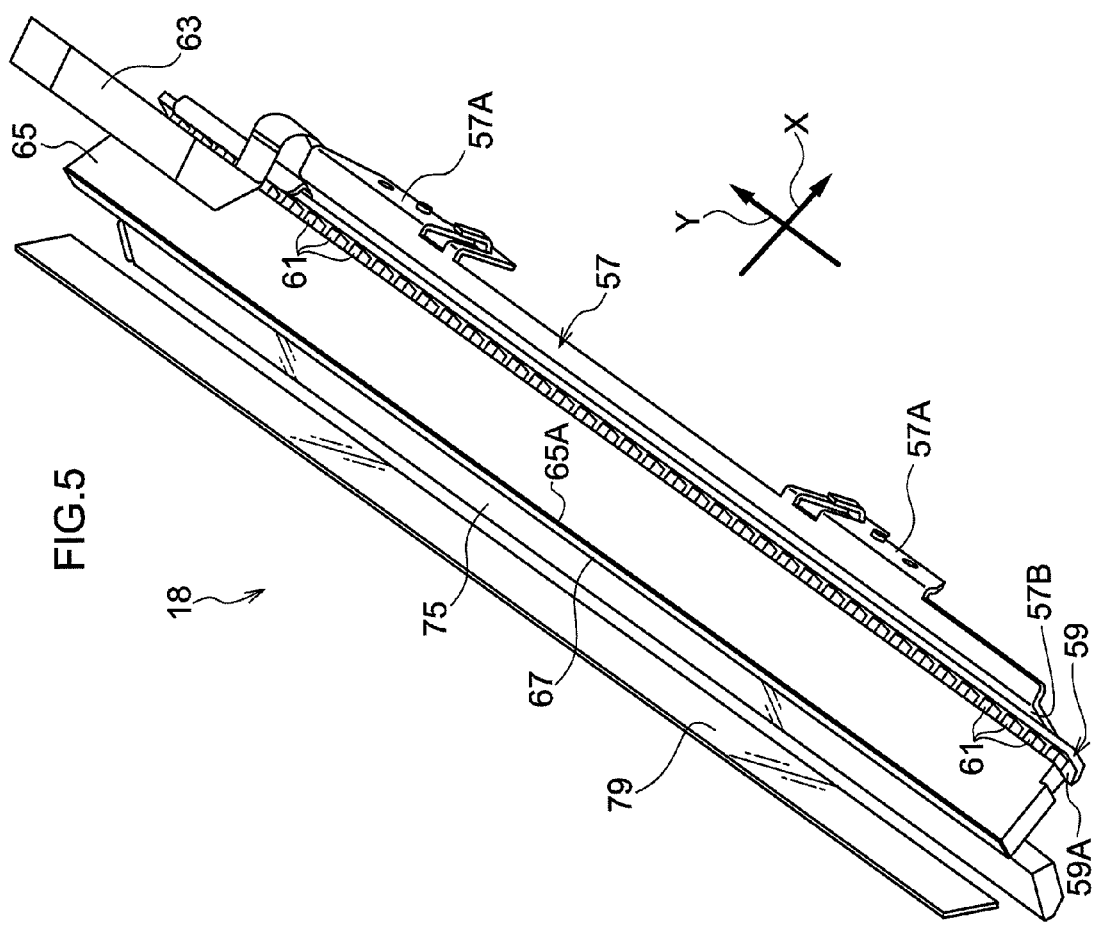
FIG. 5 is a perspective view of the interior of the main portion of the document reading device relating to the first exemplary embodiment of the present invention.

As shown in FIG. 5, a light source 59, in which the plural light-emitting elements 61 that are examples of point light sources are disposed along the main scanning direction on a circuit board 59A whose longitudinal direction is the main scanning direction, is mounted to another planar portion 57B of the bracket 57, which planar portion 57B is incliningly disposed. Electricity is supplied to the circuit board 59A from the control portion 71 (see FIG. 1) via a flexible substrate 63 that is connected to an end portion of the circuit board 59A. Note that, in the present exemplary embodiment, LED (Light Emitting Diode) elements are used as the light-emitting elements 61.

Here, a light source driving circuit (not illustrated) for driving the light source 59 is incorporated within the control portion 71 (see FIG. 1) of the image forming device 10. This light source driving circuit is equipped with switches that switch the light-emitting elements 61 on and off, and resistors that adjust the light amounts of the lights that are illuminated from the respective light-emitting elements 61 onto the reading document G (see FIG. 1). Further, the light source driving circuit drives the light source 59 on the basis of light source driving signals that are for controlling the on/off states of light-emission of the light-emitting elements 61, and adjustment signals that are for adjusting the light amounts of the lights.

As shown in FIG. 6, the respective light-emitting elements 61 are disposed so as to be inclined at a predetermined angle with respect to the surface GA to be read of the reading document G. Due thereto, the light that exits from the light-emitting elements 61 toward the reading document G is incident from a predetermined inclined direction with respect to the surface GA to be read of the reading document G, and is scattered. Therefore, as compared with a case in which light is incident perpendicularly with respect to the surface GA to be read of the reading document G, regular reflection at the background (white) of the reading document G is suppressed, and a decrease in the luminance difference (contrast) of the image is suppressed.

A light guiding member 65, whose longitudinal direction is the main scanning direction and that corresponds to an example of a light guiding body, is disposed within the first carriage 18 so as to face the light-emitting surfaces of the respective light-emitting elements 61. As an example, the light guiding member 65 is structured by forming an acrylic resin in a parallelepiped shape. Both end portions of the light guiding member 65 in the main scanning direction are supported by the side plates 55A, 55B. The light guiding member 65 diffuses, at least in the main scanning direction, light that has directivity, and guides the light, that exits from the light-emitting elements 61, to near the reading position of the reading document G (see FIG. 1).

Figure 7:
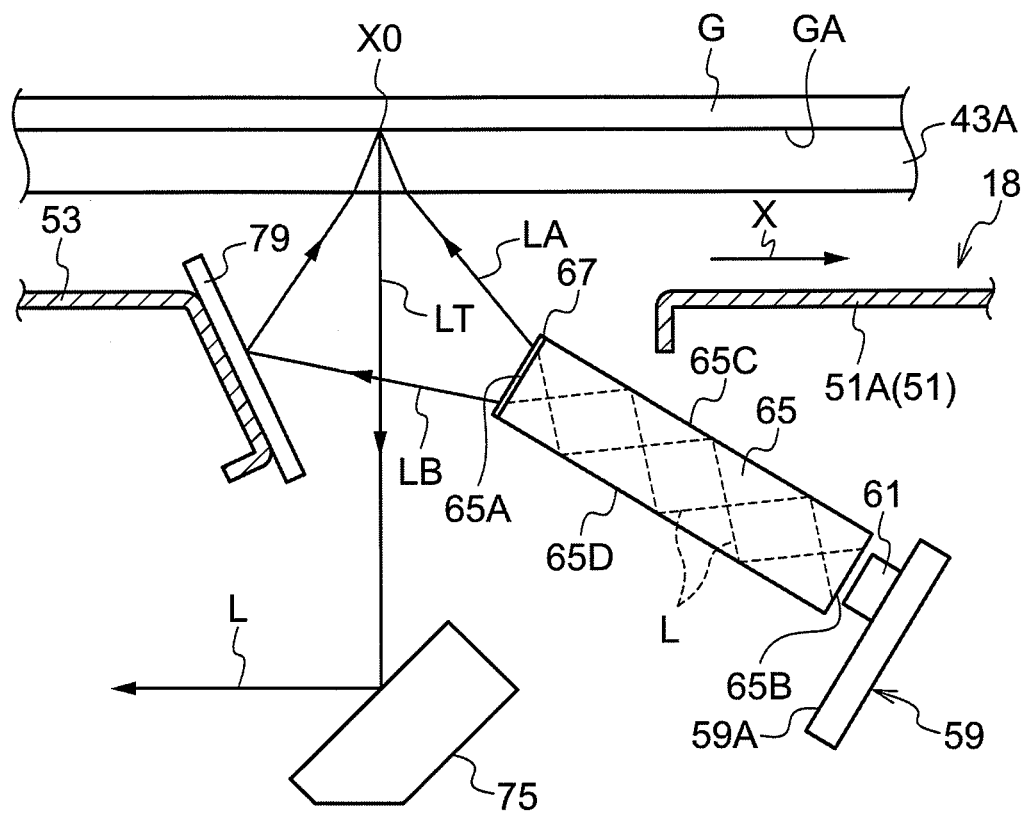
FIG. 7 is a partial portional view of the main portion of the document reading device relating to the first exemplary embodiment of the present invention.

As shown in FIG. 7, the light guiding member 65 has a light incident surface 65B on which the light L is incident, a light exiting surface 65A from which the light L exits, an upper surface 65C that is positioned upward (at the reading document G side) in the transverse (depthwise) direction, and a lower surface 65D that faces the upper surface 65C and is positioned downward of the upper surface 65C. The upper surface 65C and the lower surface 65D are set to be a predetermined surface roughness such that the light L is totally reflected and advances through the interior of the light guiding member 65.

Due thereto, at the light exiting surface 65A that is at the opposite side of the surface of the light guiding member 65 that faces the light-emitting elements 61, the lights from the light-emitting elements 61 of the light source 59 are totally reflected at the interior and exit, and dispersion in the light amount distribution at the light exiting surface 65A is suppressed. Note that, in order for the light guiding member 65 to guide the light, that is incident from the light source 59, to near the reading position, it is preferable that the light guiding member 65 be formed of a material at which it is difficult for the light amount to be damped. Examples of other materials for the light guiding member 65 are polycarbonate resin, polyimide resin, glass, and the like.

A diffusing plate 67, whose longitudinal direction is the main scanning direction and that is light-transmissive and that is an example of a light diffusing portion, is joined to the light exiting surface 65A of the light guiding member 65. The diffusing plate 67 is formed of, for example, an acrylic resin. A convex and concave pattern (not shown), that diffuses that light that is incident from the light exiting surface 65A of the light guiding member 65, is formed on the light exiting surface of the diffusing plate 67. By varying the shape of this convex and concave pattern, the light that exits from the diffusing plate 67 is shaped in a circular form or an oval form. Note that examples of other materials for the diffusing plate 67 are polycarbonate resin, polyester resin, glass, and the like. Here, because the diffusing plate 67 is joined to the light guiding member 65 and is integral therewith, the number of mounting processes is reduced as compared with a case in which the diffusing plate 67 and the light guiding member 65 are mounted separately to the first carriage 18.

On the other hand, a reflecting plate 79, that reflects the light exiting from the diffusing plate 67 and guides the light to the reading position (the surface GA to be read) of the reading document G, is disposed at a position that is set apart from the diffusing plate 67 by a predetermined distance in the subscanning direction. The reflecting plate 79 is a mirror surface body whose longitudinal direction is the main scanning direction. The surface of the reflecting plate 79 that is at the side opposite the light reflecting surface thereof is fixed to an inclined surface of the second holder 53.

The first mirror 75, that guides the light reflected at the reading document G to the second mirror 45A (see FIG. 3) of the second carriage 22, is provided further downward than the light guiding member 65 and the diffusing plate 67. Both end portions of the first mirror 75 are inserted-through and held in hole portions that are formed in the side plates 55A, 55B (see FIG. 4).

The reading operation at the time of reading the image of the reading document G that is conveyed-in onto the second platen glass 43B, is described next.

As shown in FIG. 6, the first carriage 18 is stopped at a position facing the second platen glass 43B. Then, at the first carriage 18, when the reading operation is started, the reading document G is conveyed on the second platen glass 43B, and the respective light-emitting elements 61 emit light. The light L exiting from the respective light-emitting elements 61 is, while spreading at a predetermined divergence angle, incident into the light guiding member 65, and advances within the light guiding member 65 at an angle that is greater than a critical angle, i.e., advances toward the light exiting surface 65A while being totally reflected, and is diffused at the diffusing plate 67.

Here, given that the optical axis of the light L, that is reflected at the surface GA to be read of the reading document G and heads toward the first mirror 75, is LT, a portion of the light L that is diffused at the diffusing plate 67 passes through the second platen glass 43B and is illuminated onto the reading document G from one side of the optical axis LT. The remainder of the light L is reflected at the reflecting plate 79, and thereafter, passes through the second platen glass 43B and is illuminated onto the reading document G from the other side of the optical axis LT. Further, the light L that is illuminated onto the reading document G is reflected at the surface GA to be read of the reading document G, and thereafter, is reflected at the first mirror 75, and, as shown in FIG. 3, goes from the second carriage 22 through the lens 24 for imaging and is imaged at the photoelectric converting element 26 such that reading of the image information is carried out.

The reading operation at the time of reading the image of the reading document G that is placed on the first platen glass 43A is described next.

As shown in FIG. 7, when the reading document G is placed on the first platen glass 43A and the reading operation is started, the first carriage 18 moves in the subscanning direction (the arrow X direction), and the light-emitting elements 61 emit light. Then, the light L that exits from the light-emitting elements 61 is, while spreading at a predetermined divergence angle, incident from the light incident surface 65B into the light guiding member 65. At the interior of the light guiding member 65, the light L advances toward the light exiting surface 65A while being totally reflected at the upper surface 65C and the lower surface 65D.

Next, the light L that exits from the light exiting surface 65A of the light guiding member 65 is diffused at the diffusing plate 67. A portion thereof advances as light LA toward the reading document G, and the remainder advances toward the reflecting plate 79 as light LB. The light LA is incident on and refracted at the first platen glass 43A, and is illuminated onto reading position X0 of the reading document G. On the other hand, the light LB is reflected at the reflecting plate 79 and is incident on and refracted at the first platen glass 43A, and is illuminated onto the reading position X0 of the reading document G. Note that the reading position X0 is a central position of the intensity distribution of the light L illuminated on the reading document G.

Subsequently, of the light L that is reflected at the reading position X0 of the reading document G and has become diffused light, the light L that heads downward along the optical axis LT is reflected at the first mirror 75. Then, as shown in FIG. 3, the light passes from the second mirror 45A and the third mirror 45B of the second carriage 22 through the lens 24 for imaging, and is imaged at the photoelectric converting element 26.

The relationship between placement interval F of the plural light-emitting elements 61 and the light intensity (luminance) of the light L on the diffusing plate 67 is described next. The placement interval F of the light-emitting elements 61 is the distance, in the main scanning direction, from the central position of one of the light-emitting elements 61 to the central position of the adjacent light-emitting element 61.

Figure 8A:
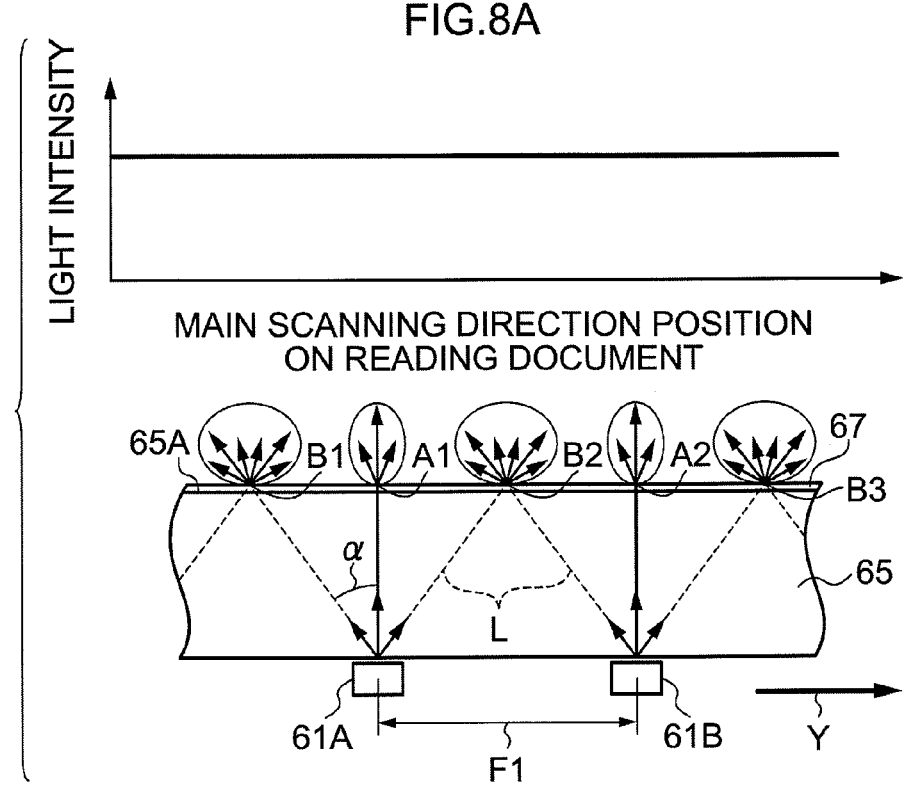
FIG. 8A is a schematic drawing showing changes in the distributed state of light intensity in the main scanning direction (a first direction) on a reading document surface when the placement interval of plural light-emitting elements is changed.

As shown in FIG. 8A, the placement interval in the main scanning direction (the arrow Y direction) of adjacent light-emitting elements 61A, 61B is F1. The exiting positions on the diffusing plate 67 of the light L that advances at divergence angle α from the light-emitting element 61A and passes through the light guiding member 65 are positions A1, B1, B2. The exiting positions on the diffusing plate 67 of the light L that advances at the divergence angle α from the light-emitting element 61B and passes through the light guiding member 65 are positions A2, B2, B3. The positions A1, A2 are the exiting positions of the lights L that advance straight forward, and the positions B1, B2, B3 are the exiting positions of the lights L that diverge the most.

Here, at the positions A1, A2, the light intensity is high because the positions A1, A2 are on the optical axes of the lights L and are the centers of light intensity distributions. Further, at the position B2 (the same holds for the positions B1, B3 as well), the light intensity is high because, although the position B2 is offset from the center of the light intensity distribution, the light L from the light-emitting element 61A and the light L from the light-emitting element 61B reach the position B2. Due thereto, when the placement interval of the plural light-emitting elements 61 is F1, even if the main scanning direction positions on the diffusing plate 67, i.e., the main scanning direction positions on the surface GA to be read, change, there is a state in which the light intensity hardly changes at all.

Figure 8B:
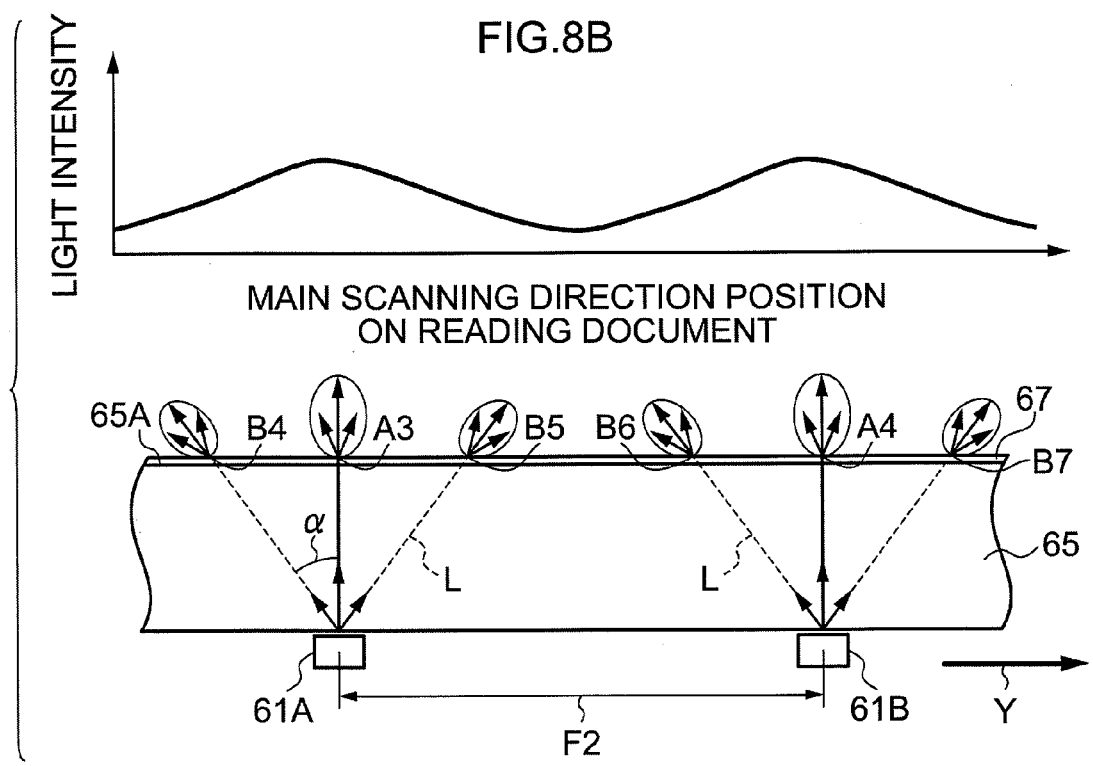
FIG. 8B is a schematic drawing showing changes in the distributed state of light intensity in the main scanning direction (the first direction) on the reading document surface when the placement interval of the plural light-emitting elements is changed.

On the other hand, as shown in FIG. 8B, the placement interval in the main scanning direction (the arrow Y direction) of the adjacent light-emitting elements 61A, 61B is F2 (>F1). The exiting positions on the diffusing plate 67 of the light L that advances at the divergence angle α from the light-emitting element 61A and passes through the light guiding member 65 are positions A3, B4, B5. The exiting positions on the diffusing plate 67 of the light L that advances at the divergence angle α from the light-emitting element 61B and passes through the light guiding member 65 are positions A4, B6, B7. The positions A3, A4 are the exiting positions of the lights L that advance straight forward, and the positions B4, B5, B6, B7 are the exiting positions of the lights L that diverge the most.

Here, at the positions A3, A4, the light intensity is high because the positions A3, A4 are on the optical axes of the lights L and are the centers of light intensity distributions. Further, at the positions B4, B5, B6, B7, the light intensity is low as compared with at the positions A3, A4 because the positions B4, B5, B6, B7 are offset from the centers of the light intensity distributions and the regions that the lights reach do not overlap. Due thereto, when the placement interval of the plural light-emitting elements 61 is F2, once the main scanning direction positions on the diffusing plate 67 change, the light intensity also changes. It can be understood that, in this way, the placement interval F of the plural light-emitting elements 61 influences the light intensity distribution state in the main scanning direction (the arrow Y direction).

Next, the relationship between width S of the light guiding member 65 and the light intensity (luminance) of the light L on the diffusing plate 67 is described.

Figure 9:
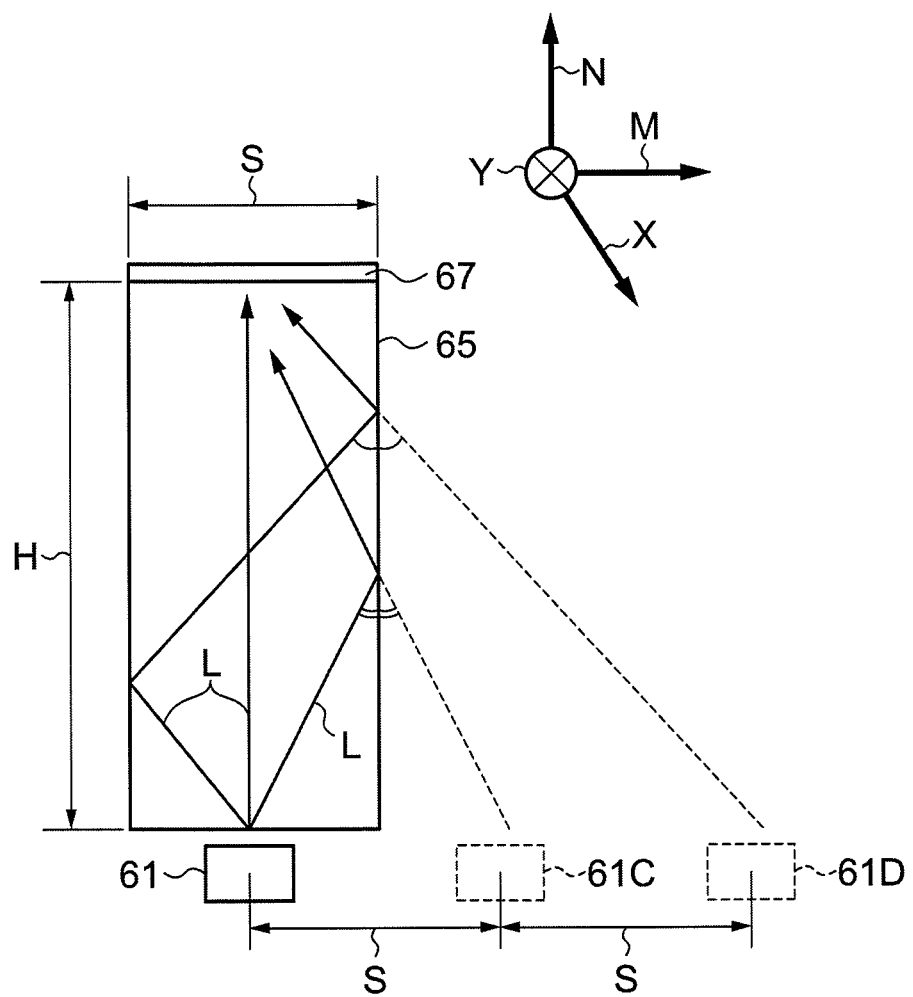
FIG. 9 is a schematic drawing showing the traveling state of light within a light guiding member, and the positions of mirror images of a light-emitting element in a second direction.

A state of viewing the light-emitting elements 61, the light guiding member 65, and the diffusing plate 67 from the Y direction is shown in FIG. 9. Note that, in the present exemplary embodiment, the arrow X direction is the moving direction of the first carriage 18 (see FIG. 6) and the subscanning direction, and the Y direction corresponds to the main scanning direction and the first direction that intersects with the arrow X direction. Further, arrow M direction is a second direction that intersects (here, as an example, is orthogonal to) with the first direction, and is the in-plane direction of the diffusing plate 67. Arrow N direction is the out-plane direction of the diffusing plate 67 that intersects (here, as an example, is orthogonal to) with the second direction.

The cross-portion of the light guiding member 65 as seen from the first direction is a rectangular shape of width S×height H, and the width in the second direction is S. Note that, in the present exemplary embodiment, description is given with the width of the diffusing plate 67 in the second direction also being S. However, the width of the diffusing plate 67 in the second direction does not have to be the same width as that of the light guiding member 65. Further, in the present exemplary embodiments (the first and second exemplary embodiments), due to limitations on the placement region and the like, the height H of the light guiding member 65 in the arrow N direction is not changed in accordance with the magnitudes of the placement interval F of the light-emitting elements 61 and the width S of the light guiding member 65.

At the light guiding member 65, the light L that is incident from the light-emitting element 61 proceeds toward the diffusing plate 67 while advancing straight forward or while being totally reflected at the side surface. Note that the total reflection of the light L at the side surfaces of the light guiding member 65 can be considered to be incident lights from light-emitting elements 61C, 61D that are mirror images whose plane of symmetry is that side surface. The placement interval between the light-emitting element 61 and the light-emitting element 61C, and the placement interval between the light-emitting element 61C and the light-emitting element 61D, are both the width S of the light guiding member 65. Namely, mirror images of the light-emitting element 61 are lined-up at the width S of the light guiding member 65.

Here, when the width S becomes large without the height H (the length in the arrow N direction) of the light guiding member 65 being changed, the light intensity (luminance) distribution of the light L in the second direction varies and the light intensity decreases locally, in the same way as when the placement interval F of the light-emitting elements 61 in the main scanning direction (the first direction) is made to be large. Further, when the position in the subscanning direction (the arrow X direction) on the reading document G changes, the light intensity also changes. For these reasons, it can be understood that the width S of the light guiding member 65 in the second direction influences the light intensity distribution state in the subscanning direction (the X direction).

As described above, the light intensity distribution state in the main scanning direction, the subscanning direction on the diffusing plate 67 varies in accordance with the placement interval F of the light-emitting elements 61 in the main scanning direction (the first direction) and the width S of the light guiding member 65 in the second direction. Therefore, in the present exemplary embodiment, the diffusion angle of the light L that exits from the diffusing plate 67 is prescribed on the basis of the placement interval F of the light-emitting elements 61 and the width S of the light guiding member 65.

The diffusion angle of the diffusing plate 67 is described next.

Figure 10:
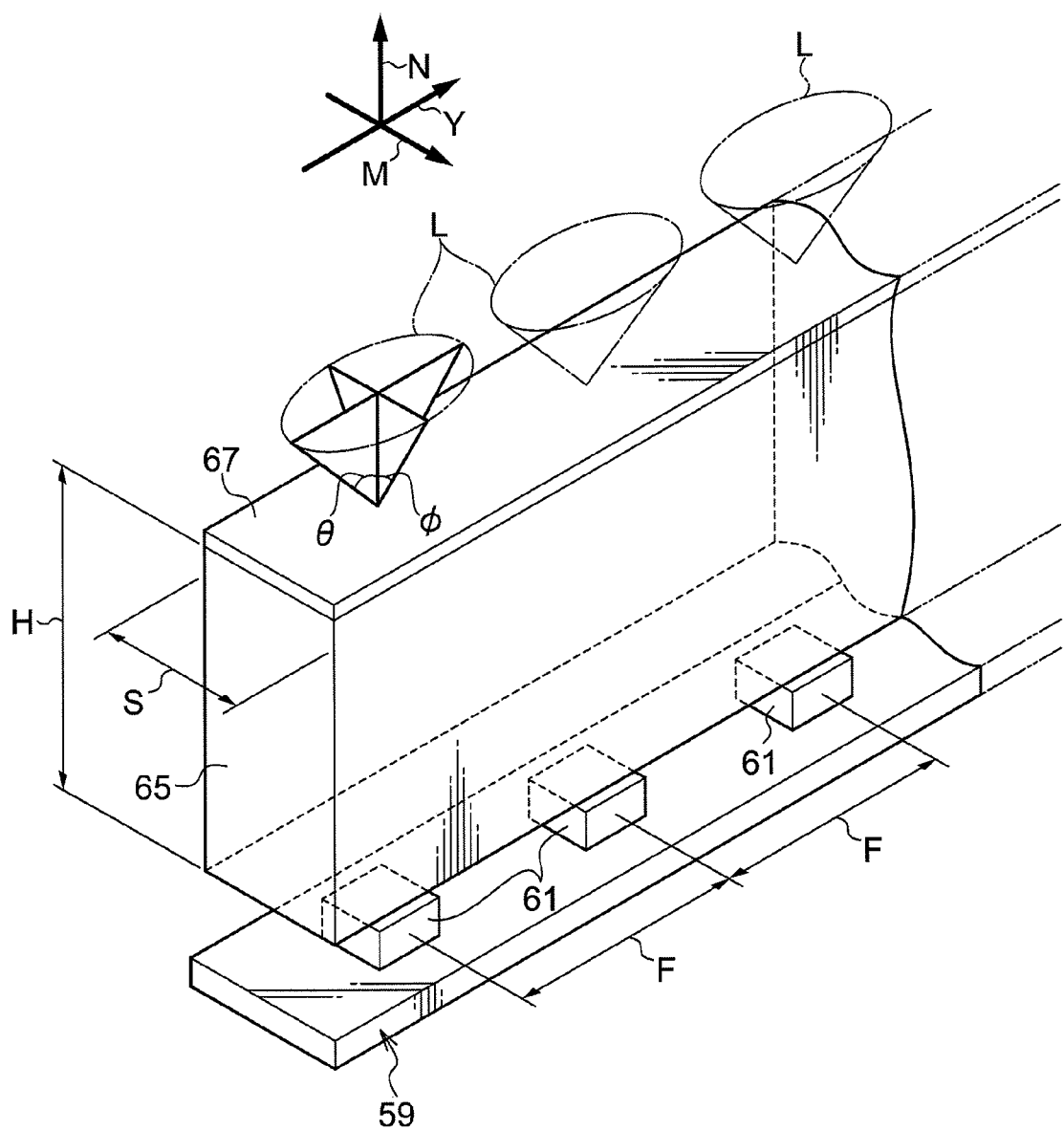
FIG. 10 is a perspective view showing the diffused state of light exiting from a diffusing plate relating to the first exemplary embodiment of the present invention.

As shown in FIG. 10, at the diffusing plate 67, the diffusion angle in the first direction (the arrow Y direction) is a first diffusion angle θ, and the diffusion angle in the second direction is a second diffusion angle φ. The convex and concave pattern is formed such that the light L that is incident from the light guiding member 65 is diffused at the first diffusion angle θ, the second diffusion angle φ.

Figure 11A:
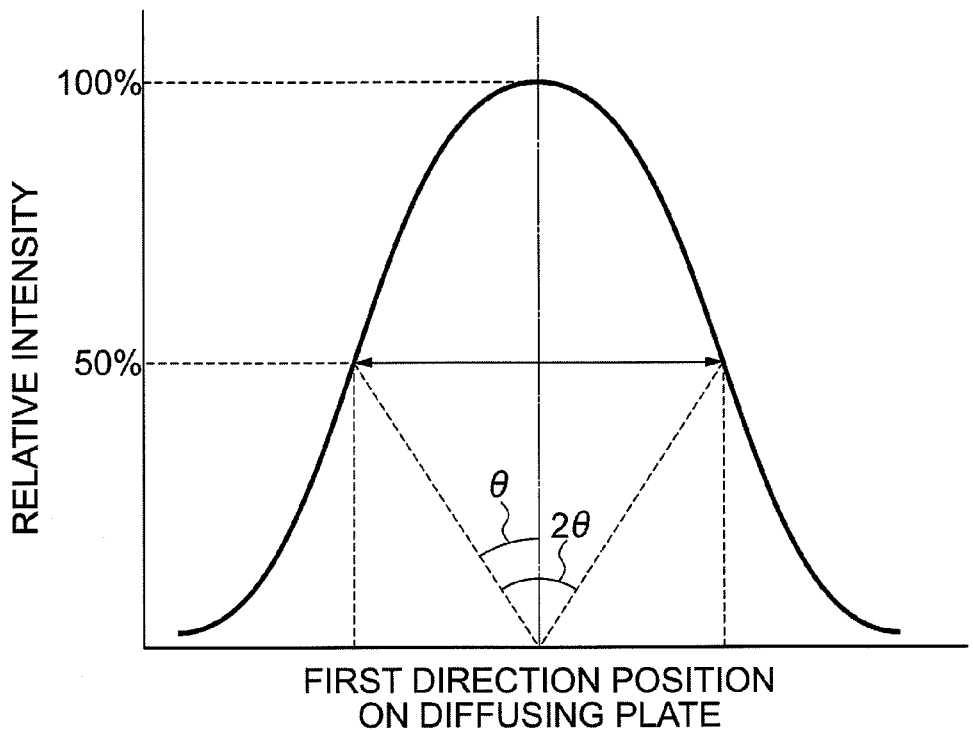
FIG. 11A is a graph showing the relative intensity distribution in the main scanning direction on the diffusing plate of light exiting from the diffusing plate relating to the first exemplary embodiment of the present invention.
Figure 11B:
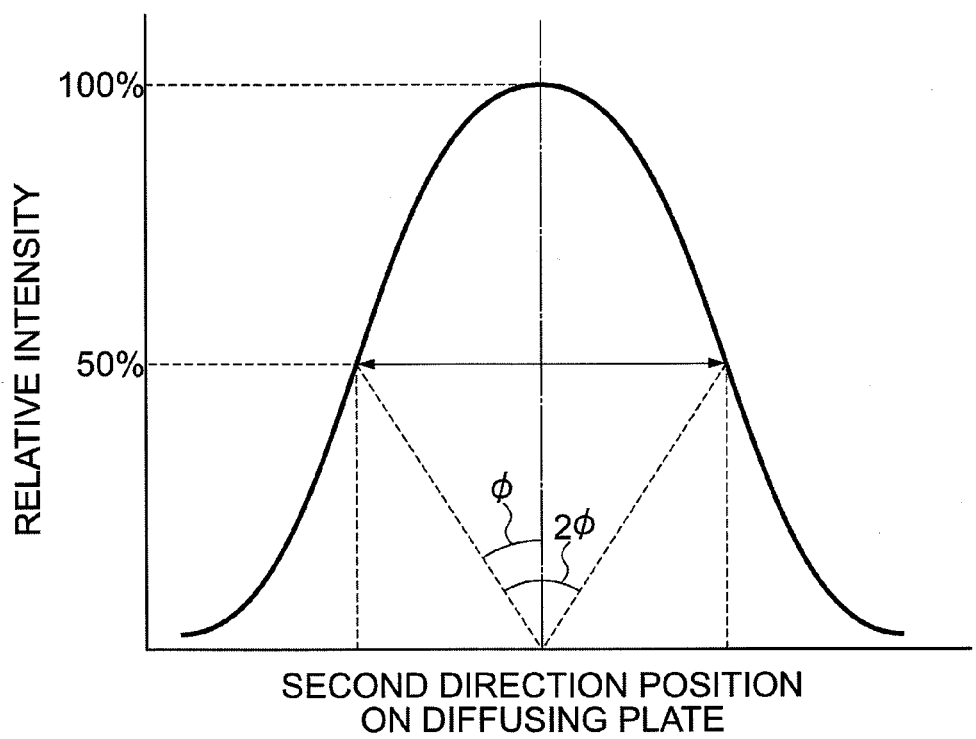
FIG. 11B is a graph showing the relative intensity distribution in the second direction on the diffusing plate of light exiting from the diffusing plate relating to the first exemplary embodiment of the present invention.

Here, as shown in FIG. 11A, the light intensity (relative intensity) in the first direction on the diffusing plate 67 (see FIG. 10) is distributed with a relative intensity of 100% being the intensity distribution center. The first diffusion angle θ is defined as ½ of the diffusion angle (2θ) at which the relative intensity is 50% that is the half-value of the intensity distribution center. Similarly, as shown in FIG. 11B, the light intensity (relative intensity) in the second direction on the diffusing plate 67 (see FIG. 10) is distributed with a relative intensity of 100% being the intensity distribution center. The second diffusion angle φ is defined as ½ of the diffusion angle (2φ) at which the relative intensity is 50% that is the half-value of the intensity distribution center.

Note that the first diffusion angle θ, the second diffusion angle φ are diffusion angle characteristics at the diffusing plate 67. The actual light intensities in the first direction, the second direction of the light L exiting from the diffusing plate 67 are a combination of the intensity distributions in which the respective lights that are incident from the respective light-emitting elements 61 diffuse.

Figure 12A:
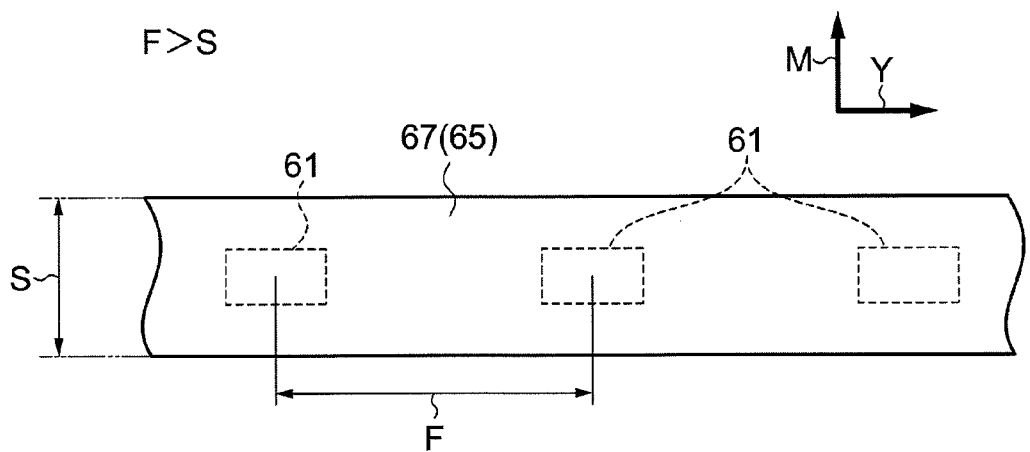
FIG. 12A is a schematic drawing showing a state of viewing the light-emitting elements from the diffusing plate when the placement interval of the light-emitting elements relating to the first exemplary embodiment of the present invention is greater than the width of the light guiding member.

Here, as shown in FIG. 12A, in the first exemplary embodiment, the width S of the light guiding member 65 in the second direction (the arrow M direction) is smaller than the placement interval F of the light-emitting elements 61 in the first direction (the arrow Y direction) (F>S). Therefore, at the diffusing plate 67, a convex and concave pattern is formed such that the first diffusion angle θ is greater than or equal to the second diffusion angle φ.

Operation of the first exemplary embodiment is described next.

Figure 12B:
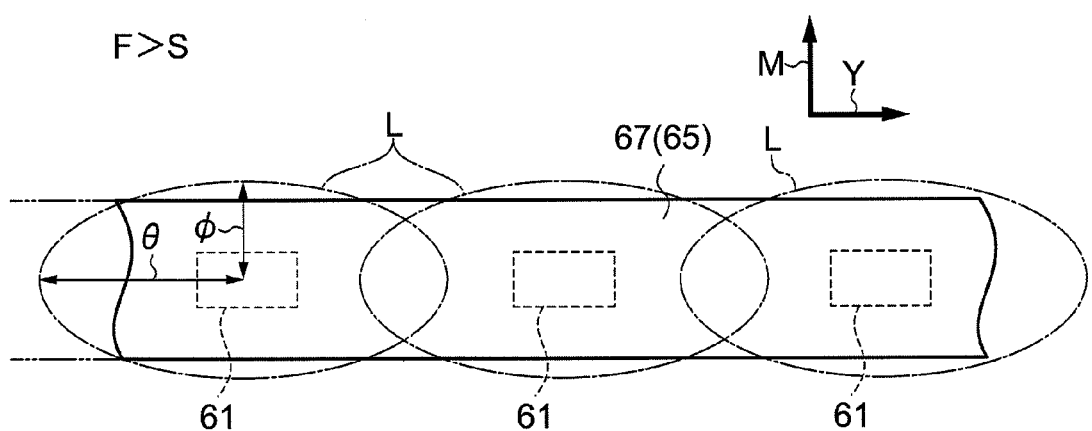
FIG. 12B is a schematic drawing showing the diffused state of light exiting from the diffusing plate when the placement interval of the light-emitting elements relating to the first exemplary embodiment of the present invention is greater than the width of the light guiding member.

As shown in FIG. 12B, the lights L, that the light-emitting elements 61 emit and that pass through the interior of the light guiding member 65, are diffused at the diffusing plate 67, and the first diffusion angle θ is larger than the second diffusion angle φ, and the lights L advance while spreading in oval forms with the longitudinal axis directions thereof being the first direction. Due thereto, the luminance difference on the diffusing plate 67 becomes small.

In this way, in the present exemplary embodiment, even if the placement interval F of the light-emitting elements 61 in the first direction (the arrow Y direction) is greater than the width S of the light guiding member 65 in the second direction (the arrow M direction), the luminance difference on the diffusing plate 67 is small.

Results of computing, by simulation, the luminance distribution of the light L on the diffusing plate are described next.

Figure 13A:
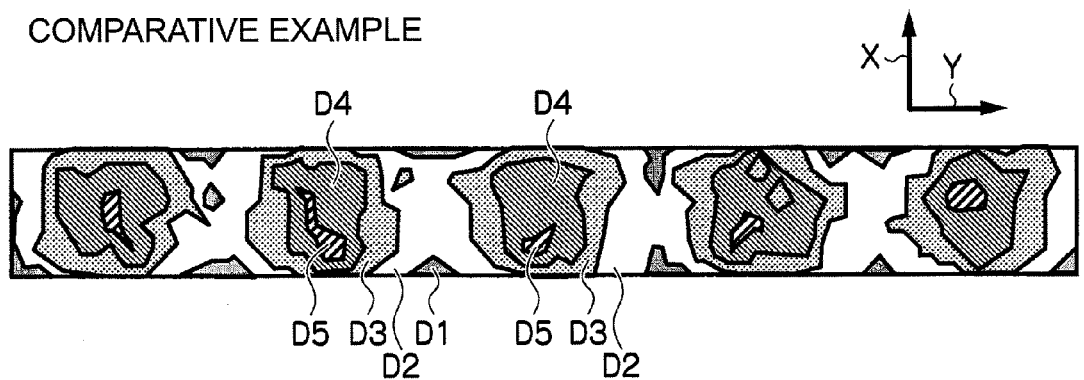
FIG. 13A is a distribution diagram of light intensity on a reading document surface in a comparative example.

FIG. 13A shows, as a comparative example, luminance distribution computation results of the light L on the diffusing plate 67 when the placement interval F of the light-emitting elements 61 in FIG. 10 in the first direction (the arrow Y direction) is F=8.8 mm, the width S of the light guiding member 65 in the second direction (the arrow M direction) is S=5.5 mm, and the height H of the light guiding member 65 in the arrow N direction is H=19 mm, and the first diffusion angle θ in the first direction is set to be θ=10° and the second diffusion angle φ in the second direction is set to be φ=10°. Note that, in FIG. 13A, the luminance of the light L is shown in five levels, and the heights of luminances D1, D2, D3, D4, D5 are such that D1<D2<D3<D4<D5.

Here, in the comparative example, under the condition that the placement interval F>the width S, the first diffusion angle θ and the second diffusion angle φ are set such that the first diffusion angle θ=the second diffusion angle φ=10°. Therefore, the luminance difference (which is ΔD) when the position of the light L is offset in the first direction or the second direction is great, and is ΔD=(D5−D1).

Figure 13B:
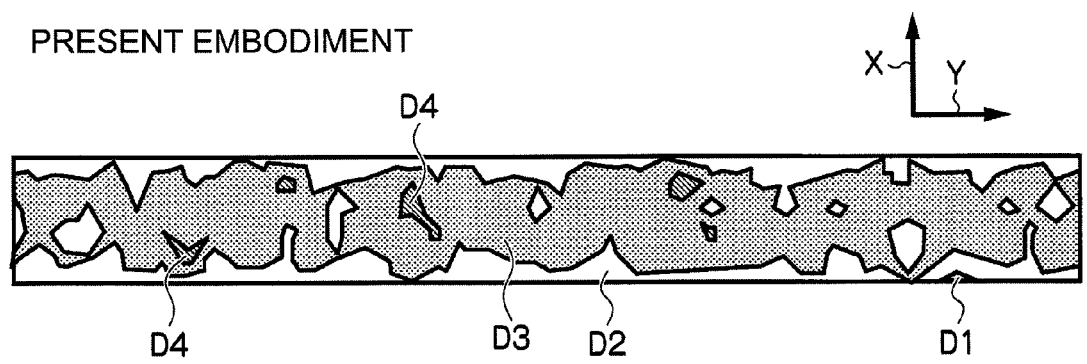
FIG. 13B is a distribution diagram of light intensity on the reading document surface when using the image reading device relating to the first exemplary embodiment of the present invention.

On the other hand, FIG. 13B shows, as the present exemplary embodiment, luminance distribution computation results of the light L on the diffusing plate 67 when the placement interval F of the light-emitting elements 61 in FIG. 10 in the first direction is F=8.8 mm, the width S of the light guiding member 65 in the second direction is S=5.5 mm, and the height H of the light guiding member 65 in the arrow N direction is H=19 mm, and the first diffusion angle θ in the first direction is set to be θ=20° and the second diffusion angle φ in the second direction is set to be φ=10°. Note that regions that are the same levels as the levels of the luminances in FIG. 13A are shown by using the same reference numerals as in FIG. 13A.

Here, the present exemplary embodiment corresponds to a case in which the placement interval F>the width S, and therefore, the first diffusion angle θ and the second diffusion angle φ are set such that the first diffusion angle θ=20°, the second diffusion angle φ=10°, so that the first diffusion angle θ>the second diffusion angle φ. The region of luminance D3 spreads, and the luminance difference ΔD when the position of the light L is offset in the first direction or the second direction is ΔD=(D4−D2) at places where it is large. Namely, it is confirmed that, in the present exemplary embodiment, the luminance difference of the light L on the diffusing plate 67 is lower than in the comparative example. Note that the luminance D1 in one place is excluded because the surface area thereof is less than or equal to 1% of the overall surface area of the luminance distribution computation surface.

A second exemplary embodiment of the image reading device is described next. Note that parts that are basically the same as in the above-described first exemplary embodiment are denoted by the same reference numerals as in the first exemplary embodiment, and description thereof is omitted.

Figure 14A:
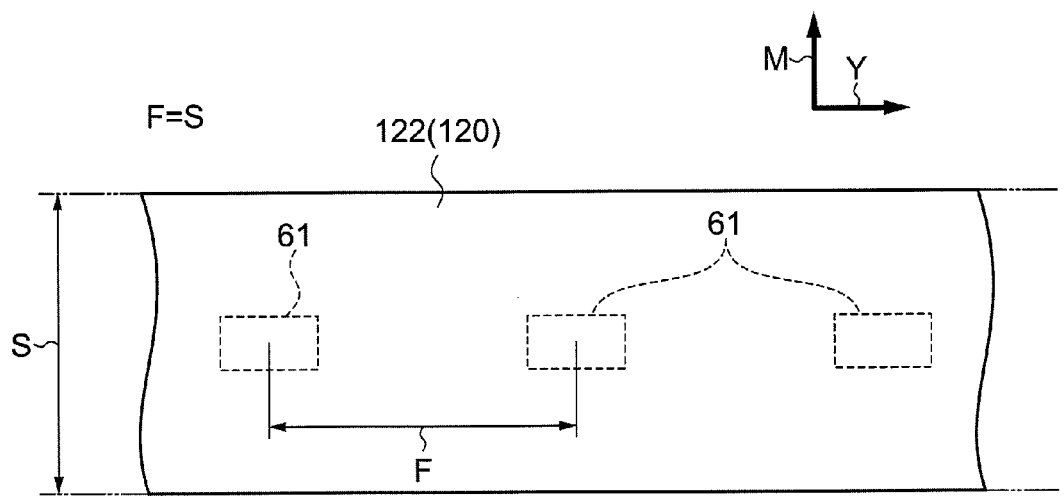
FIG. 14A is a schematic drawing showing a state of viewing light-emitting elements from a diffusing plate when the placement interval of the light-emitting elements relating to a second exemplary embodiment of the present invention is equal to the width of a light guiding member.

As shown in FIG. 14A, the second exemplary embodiment uses a light guiding member 120, that is structured of the same material as the light guiding member 65 and whose width S in the second direction (the arrow M direction) is equal to the placement interval F of the light-emitting elements 61 in the first direction (the arrow Y direction), and a diffusing plate 122. A convex and concave pattern is formed at the diffusing plate 122 such that the first diffusion angle θ is equal to the second diffusion angle φ.

Operation of the second exemplary embodiment is described next.

Figure 14B:
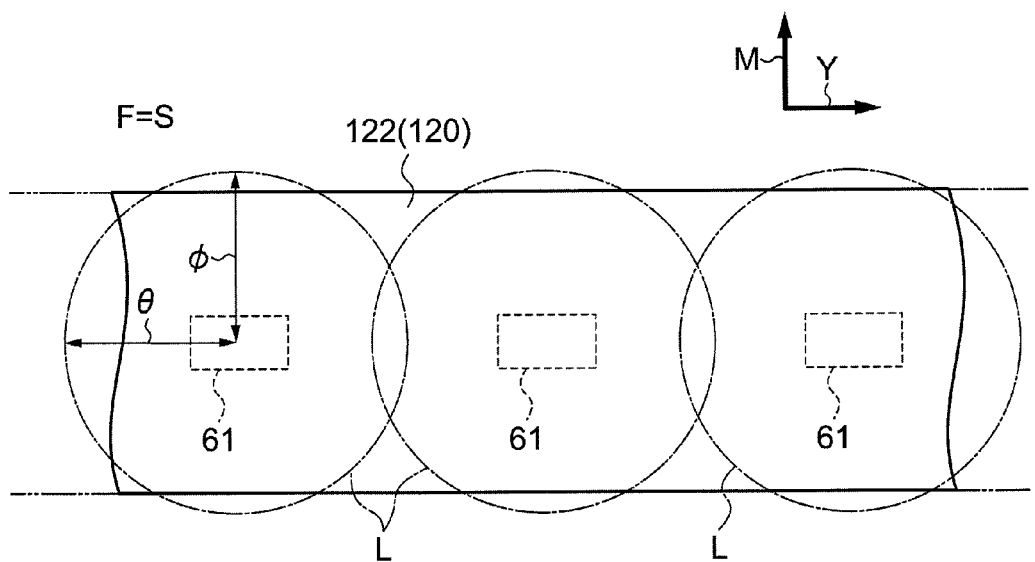
FIG. 14B is a schematic drawing showing the diffused state of light exiting from the diffusing plate when the placement interval of the light-emitting elements relating to the second exemplary embodiment of the present invention is equal to the width of the light guiding member.

As shown in FIG. 14B, when the light guiding member 120 and the diffusing plate 122 are used, the first diffusion angle θ=the second diffusion angle φ of the lights L, and the lights L spread in circular forms. Therefore, the luminance difference on the diffusing plate 122 is small.

A third exemplary embodiment of the image reading device is described next. Note that parts that are basically the same as in the above-described first and second exemplary embodiments are denoted by the same reference numerals as in the first and second exemplary embodiments, and description thereof is omitted.

Figure 15A:
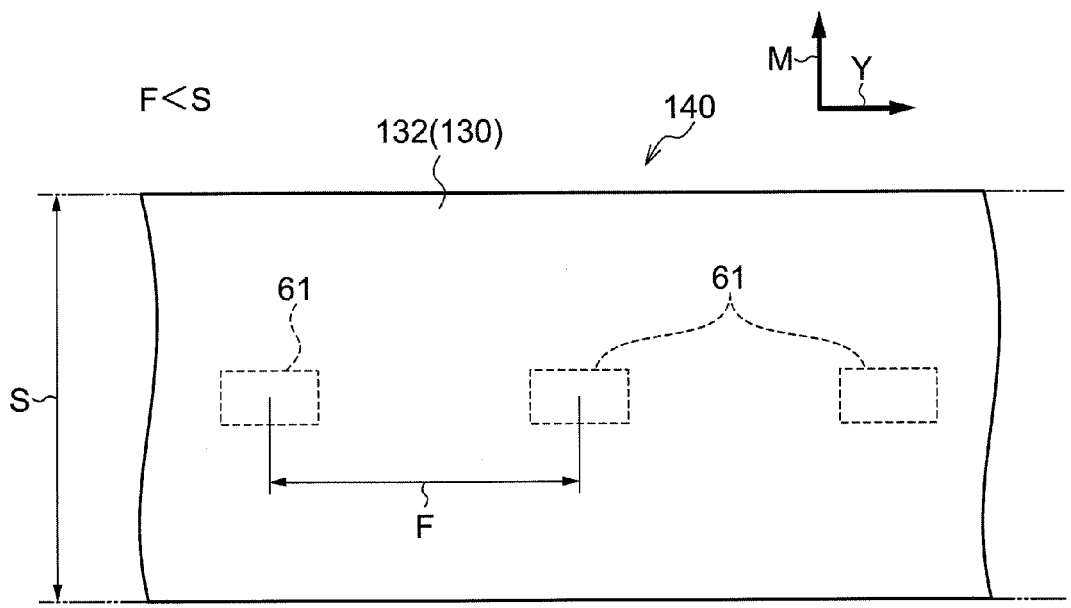
FIG. 15A is a schematic drawing showing a state of viewing light-emitting elements from a diffusing plate when the placement interval of the light-emitting elements relating to a third exemplary embodiment of the present invention is smaller than the width of a light guiding member.

As shown in FIG. 15A, a document image reading device 140 of the third exemplary embodiment is structured such that a light guiding member 130 and a diffusing plate 132 are provided instead of the light guiding member 65 and the diffusing plate 67 (see FIG. 3) of the document reading device 14 of the first exemplary embodiment (see FIG. 3).

The light guiding member 130 is structured of the same material as the light guiding member 65, and the width S in the second direction (the arrow M direction) is greater than the placement interval F of the light-emitting elements 61 in the first direction (the arrow Y direction) (F<S). Therefore, a convex and concave pattern is formed at the diffusing plate 132 such that the second diffusion angle φ becomes greater than or equal to the first diffusion angle θ. Note that the height of the light guiding member 130 in the arrow N direction (see FIG. 10) is the same as that of the light guiding member 65.

Operation of the third exemplary embodiment is described next.

Figure 15B:
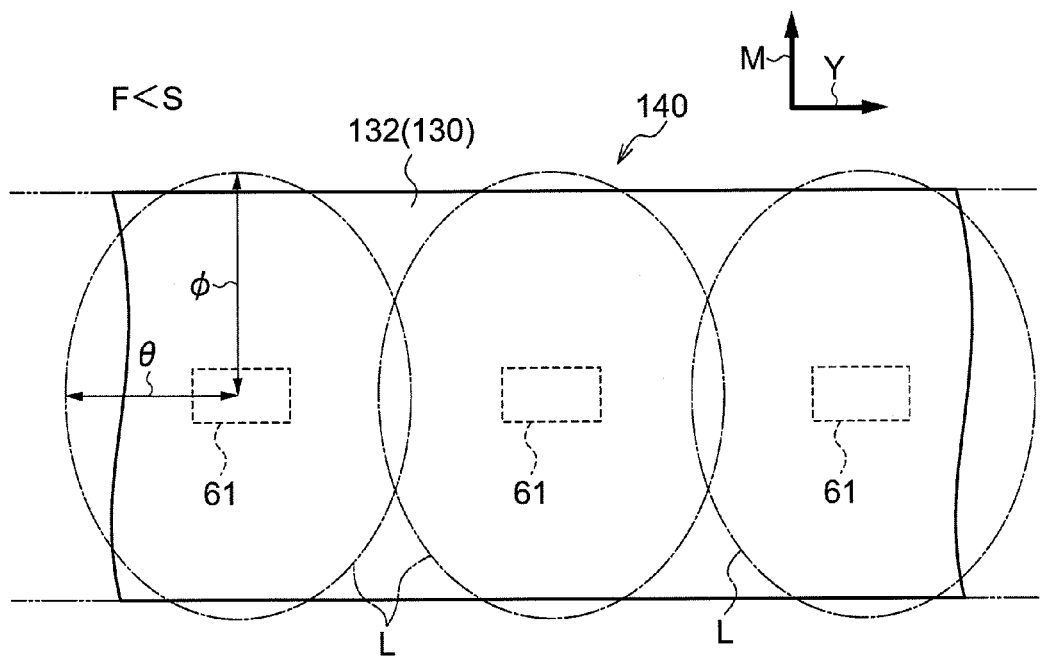
FIG. 15B is a schematic drawing showing the diffused state of light exiting from the diffusing plate when the placement interval of the light-emitting elements relating to the third exemplary embodiment of the present invention is smaller than the width of the light guiding member.

As shown in FIG. 15B, the lights L, that the light-emitting elements 61 emit and that pass through the interior of the light guiding member 130, are diffused at the diffusing plate 132, and the second diffusion angle φ is larger than the first diffusion angle θ, and the lights L advance while spreading in oval forms with the longitudinal axis directions thereof being the second direction. Due thereto, the luminance difference on the diffusing plate 132 becomes small.

In this way, in the present exemplary embodiment, even if the width S of the light guiding member 130 in the second direction is greater than the placement interval F of the light-emitting elements 61 in the first direction, the luminance difference in the second direction of the light L that is illuminated on the surface GA to be read is small.

Results of computing, by simulation, the luminance distribution of the light L on the diffusing plate are described next.

Figure 16A:
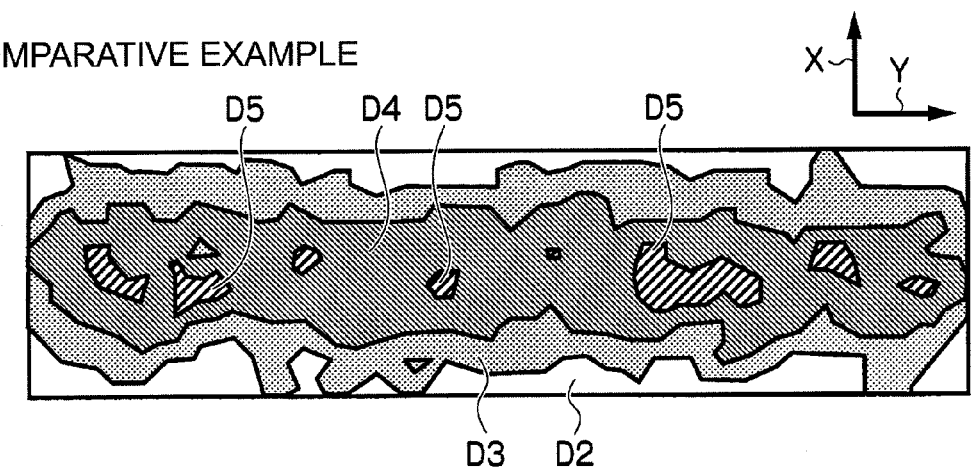
FIG. 16A is a distribution diagram of light intensity on a reading document surface in a comparative example.

FIG. 16A shows, as a comparative example, luminance distribution computation results of the light L on the diffusing plate 67 when the placement interval F of the light-emitting elements 61 in FIG. 10 in the first direction (the arrow Y direction) is F=5.5 mm, the width S of the light guiding member 65 in the second direction (the arrow M direction) is S=8 mm, and the height H of the light guiding member 65 in the arrow N direction is H=19 mm, and the first diffusion angle θ in the first direction is set to be θ=10° and the second diffusion angle φ in the second direction is set to be φ=10°. Note that regions that are the same levels as the levels of the luminances in FIG. 13A are shown by using the same reference numerals (D1, D2, D3, D4, D5) as in FIG. 13A.

Here, in the comparative example, under the condition that the placement interval F<the width S, the first diffusion angle θ and the second diffusion angle φ are set such that the first diffusion angle θ=the second diffusion angle φ=10°. Therefore, the luminance difference (which is ΔD) when the position of the light L is offset in the first direction or the second direction is great, and is ΔD=(D5−D2).

Figure 16B:
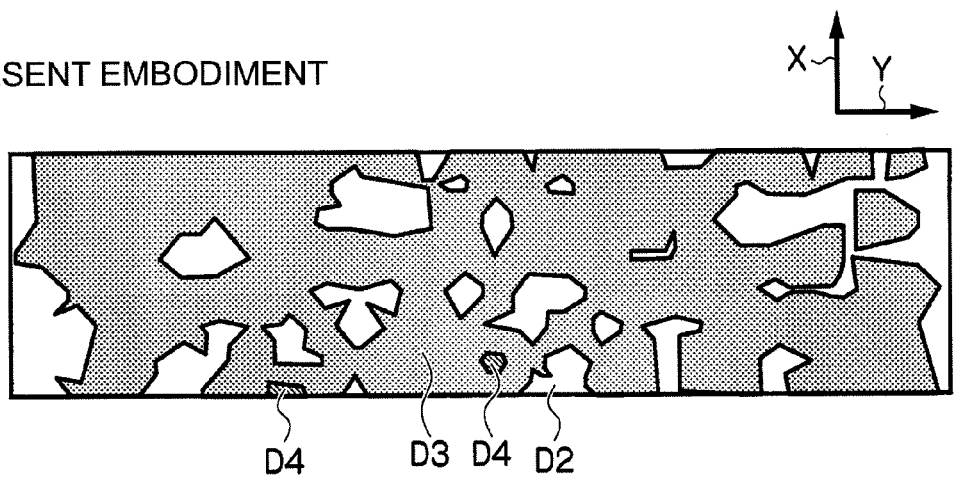
FIG. 16B is a distribution diagram of light intensity on a reading document surface when using an image reading device relating to the third exemplary embodiment of the present invention.

On the other hand, FIG. 16B shows, as the present exemplary embodiment, luminance distribution computation results of the light L on the diffusing plate 67 when the placement interval F of the light-emitting elements 61 in FIG. 10 in the first direction is F=5.5 mm, the width S of the light guiding member 65 in the second direction is S=8 mm, and the height H of the light guiding member 65 in the arrow N direction is H=19 mm, and the first diffusion angle θ in the first direction is set to be θ=10° and the second diffusion angle φ in the second direction is set to be φ=20°. Note that regions that are the same levels as the levels of the luminances in FIG. 16A are shown by using the same reference numerals as in FIG. 16A.

Here, the present exemplary embodiment corresponds to a case in which the placement interval F<the width S, and therefore, the first diffusion angle θ and the second diffusion angle are set such that the first diffusion angle θ=10°, the second diffusion angle φ=20°, so that the first diffusion angle θ<the second diffusion angle φ. The region of luminance D3 spreads, and the luminance difference ΔD when the position of the light L is offset in the first direction or the second direction is ΔD=(D3−D2) at places where it is large. Namely, it is confirmed that, in the present exemplary embodiment, the luminance difference of the light L on the diffusing plate 67 is lower than in the comparative example. Note that the luminance D4 in two places is excluded because the surface area thereof is less than or equal to 1% of the overall surface area of the luminance distribution computation surface.

As described above, in the document reading device 14 (see FIG. 3) relating to the present exemplary embodiments (the first, second and third exemplary embodiments), the luminance difference of the light L on the diffusing plate 67, 122, 132 is low in the first direction and the second direction. Therefore, glare as seen is reduced, and further, changes in the read image density that arise due to reading of a curled document or the like are suppressed.

The present invention is not limited to the above-described exemplary embodiments.

The diffusing plate 67 is not limited to a structure that is joined to the light exiting surface 65A of the light guiding member 65, and may be separated from the light exiting surface 65A and be a body that is separate from the light guiding member 65.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
    a plurality of point light sources, each point light source being disposed at a placement interval F in a first direction;
    a light guiding body having an exit surface, incident light from the plurality of light sources exiting from the exit surface to a surface to be read, and a width S of the exit surface, in a second direction intersecting with the first direction, being smaller than the placement interval F;
    a light diffusing portion which diffuses light exiting from the exit surface, at an angle that is greater in the first direction than in the second direction; and
    a reading portion which receives light reflected at the surface to be read, and reads an image at the surface to be read.

2. The image reading device of claim 1, wherein the light diffusing portion is provided integrally with the light guiding body.

3. An image forming device comprising:
    the image reading device of claim 1; and
    an image forming portion which forms an image on the basis of image information from the image read at the reading portion of the image reading device.

4. The image reading device of claim 1, wherein the placement interval F is a pitch of the plurality of light sources in the first direction.

5. The image reading device of claim 1, wherein the second direction is orthogonal to the first direction.

6. The image reading device of claim 1, wherein the light guiding body has a rectangular shape, and two sides of the light guiding body extend in the first direction and the second direction, respectively.

7. An image reading device comprising:
    a plurality of point light sources, each point light source being disposed at a placement interval F in a first direction;
    a light guiding body having an exit surface, incident light from the plurality of light sources exiting from the exit surface to a surface to be read, and a width S of the exit surface, in a second direction intersecting with the first direction, being equal to the placement interval F;
    a light diffusing portion which diffuses light exiting from the exit surface, at an equal angle in the first direction and in the second direction; and
    a reading portion which receives light reflected at the surface to be read, and reads an image at the surface to be read.

8. The image reading device of claim 7, wherein the light diffusing portion is provided integrally with the light guiding body.

9. An image forming device comprising:
    the image reading device of claim 7; and
    an image forming portion which forms an image on the basis of image information from the image read at the reading portion of the image reading device.

10. An image reading device comprising:
    a plurality of point light sources, each point light source being disposed at a placement interval F in a first direction;
    a light guiding body having an exit surface, incident light from the plurality of light sources exiting from the exit surface to a surface to be read, and a width S of the exit surface, in a second direction intersecting with the first direction, being greater than the placement interval F;
    a light diffusing portion which diffuses light exiting from the exit surface, at an angle that is smaller in the first direction than in the second direction; and
    a reading portion which receives light reflected at the surface to be read, and reads an image at the surface to be read.

11. The image reading device of claim 10, wherein the light diffusing portion is provided integrally with the light guiding body.

12. An image forming device comprising:
    the image reading device of claim 10; and
    an image forming portion which forms an image on the basis of image information from the image read at the reading portion of the image reading device.

* * * * *